(12) United States Patent
Ramer et al.

US008760051B2

(10) Patent No.: US 8,760,051 B2
(45) Date of Patent: Jun. 24, 2014

(54) LAMP USING SOLID STATE SOURCE

(71) Applicant: ABL IP Holding LLC, Conyers, GA (US)

(72) Inventors: David P. Ramer, Reston, VA (US); Jack C. Rains, Herndon, VA (US)

(73) Assignee: ABL IP Holding LLC, Conyers, GA (US)

( * ) Notice: Subject to any disclaimer, the term of this patent is extended or adjusted under 35 U.S.C. 154(b) by 0 days.

(21) Appl. No.: 13/915,909

(22) Filed: Jun. 12, 2013

(65) Prior Publication Data
US 2013/0270999 A1 Oct. 17, 2013

Related U.S. Application Data

(63) Continuation of application No. 13/040,395, filed on Mar. 4, 2011, which is a continuation of application No. 12/697,596, filed on Feb. 1, 2010, now Pat. No. 8,212,469.

(51) Int. Cl.
*H01J 7/44* (2006.01)
*H05B 37/02* (2006.01)

(52) U.S. Cl.
USPC ............................................. 315/51; 315/308

(58) Field of Classification Search
USPC ............ 315/51, 291, 308; 313/110, 317, 498, 313/503, 512, 563, 567, 637; 362/2, 85, 95, 362/101, 154, 263–265, 311.02, 351, 353, 362/368, 373, 378; 977/773, 774, 775, 950
See application file for complete search history.

(56) References Cited

U.S. PATENT DOCUMENTS 5,099,343 A 3/1992 Margerum et al.
5,608,213 A 3/1997 Pinkus et al.
(Continued)

FOREIGN PATENT DOCUMENTS

EP 2 144 275 A2 1/2010
WO WO 2008/134056 A1 11/2008
WO WO 2008/155295 A1 12/2008
WO WO 2009/137053 A1 11/2009

OTHER PUBLICATIONS

Entire prosecution history of U.S. Appl. No. 13/040,395, filed Mar. 4, 2011, entitled "Lamp Using Solid State Source and Doped Semiconductor Nanophosphor."

(Continued)

*Primary Examiner* — Thuy Vinh Tran
(74) *Attorney, Agent, or Firm* — RatnerPrestia

(57) ABSTRACT

A lamp includes a single string of light emitting diodes (LEDs), driven in common, configured to cause the lamp to emit a visible light output via a bulb. The lamp also includes a lighting industry standard lamp base, which has connectors arranged in a standard three-way lamp configuration, for providing electricity from a three-way lamp socket. Circuitry connected to receive electricity from the connectors of the lamp base as standard three-way control setting inputs drives the string of LEDs. The circuitry is configured to detect the standard three-way control setting inputs and to adjust the common drive to the string of LEDs to selectively produce a different visible light outputs of the lamp via the bulb responsive to the three-way control setting inputs. The lamp may also include nanophosphors pumped by emissions of the LEDs, so that the lamp produces a white light output of particularly desirable characteristics.

20 Claims, 11 Drawing Sheets

(56) References Cited

U.S. PATENT DOCUMENTS

| | | | |
|---|---|---|---|
| 5,749,646 A * | 5/1998 | Brittell | 362/231 |
| 5,803,592 A | 9/1998 | Lawson | |
| 5,877,490 A | 3/1999 | Ramer et al. | |
| 5,914,487 A | 6/1999 | Ramer et al. | |
| 6,007,225 A | 12/1999 | Ramer et al. | |
| 6,222,623 B1 | 4/2001 | Wetherell | |
| 6,234,648 B1 | 5/2001 | Borner et al. | |
| 6,286,979 B1 | 9/2001 | Ramer et al. | |
| 6,357,889 B1 | 3/2002 | Duggal et al. | |
| 6,361,192 B1 | 3/2002 | Fussell et al. | |
| 6,422,718 B1 | 7/2002 | Anderson et al. | |
| 6,437,861 B1 | 8/2002 | Kuta | |
| 6,447,698 B1 | 9/2002 | Ihara et al. | |
| 6,473,554 B1 | 10/2002 | Pelka et al. | |
| 6,536,914 B2 | 3/2003 | Hoelen et al. | |
| 6,566,824 B2 | 5/2003 | Panagotacos et al. | |
| 6,580,228 B1 * | 6/2003 | Chen et al. | 315/185 R |
| 6,612,717 B2 | 9/2003 | Yen | |
| 6,692,136 B2 | 2/2004 | Marshall et al. | |
| 6,700,112 B2 | 3/2004 | Brown | |
| 6,734,465 B1 | 5/2004 | Taskar et al. | |
| 6,737,681 B2 | 5/2004 | Koda | |
| 6,836,083 B2 | 12/2004 | Mukai | |
| 6,869,545 B2 | 3/2005 | Peng et al. | |
| 6,872,249 B2 | 3/2005 | Peng et al. | |
| 6,960,872 B2 | 11/2005 | Beeson et al. | |
| 6,969,843 B1 | 11/2005 | Beach et al. | |
| 6,985,163 B2 | 1/2006 | Riddle et al. | |
| 6,995,355 B2 | 2/2006 | Rains, Jr. et al. | |
| 7,025,464 B2 | 4/2006 | Beeson et al. | |
| 7,040,774 B2 | 5/2006 | Beeson et al. | |
| 7,102,152 B2 | 9/2006 | Chua et al. | |
| 7,105,051 B2 | 9/2006 | Peng et al. | |
| 7,144,131 B2 | 12/2006 | Rains | |
| 7,148,632 B2 | 12/2006 | Berman et al. | |
| 7,153,703 B2 | 12/2006 | Peng et al. | |
| 7,160,525 B1 | 1/2007 | Peng et al. | |
| 7,192,850 B2 | 3/2007 | Chen et al. | |
| 7,220,039 B2 | 5/2007 | Ahn et al. | |
| 7,235,190 B1 | 6/2007 | Wilcoxon et al. | |
| 7,235,792 B2 | 6/2007 | Elofson | |
| 7,259,400 B1 | 8/2007 | Taskar | |
| 7,273,904 B2 | 9/2007 | Peng et al. | |
| 7,350,933 B2 | 4/2008 | Ng et al. | |
| 7,374,807 B2 | 5/2008 | Parce et al. | |
| 7,510,299 B2 | 3/2009 | Timmermans et al. | |
| 7,531,149 B2 | 5/2009 | Peng et al. | |
| 7,543,961 B2 | 6/2009 | Arik et al. | |
| 7,560,677 B2 | 7/2009 | Lyons et al. | |
| 7,723,744 B2 | 5/2010 | Gillies et al. | |
| 7,768,192 B2 | 8/2010 | Van De Ven et al. | |
| 7,845,825 B2 | 12/2010 | Ramer et al. | |
| 7,905,644 B2 | 3/2011 | Chen | |
| 8,079,729 B2 | 12/2011 | Van De Ven et al. | |
| 8,573,807 B2 * | 11/2013 | Borkar et al. | 362/249.05 |
| 2004/0062041 A1 | 4/2004 | Cross et al. | |
| 2004/0135504 A1 | 7/2004 | Tamaki et al. | |
| 2004/0151008 A1 | 8/2004 | Artsyukhovich et al. | |
| 2004/0188594 A1 | 9/2004 | Brown et al. | |
| 2004/0201990 A1 | 10/2004 | Meyer | |
| 2004/0212321 A1 * | 10/2004 | Lys et al. | 315/291 |
| 2005/0279915 A1 | 12/2005 | Elofson | |
| 2006/0072314 A1 | 4/2006 | Rains | |
| 2006/0289884 A1 | 12/2006 | Soules et al. | |
| 2007/0034833 A1 | 2/2007 | Parce et al. | |
| 2007/0045524 A1 | 3/2007 | Rains, Jr. et al. | |
| 2007/0051883 A1 | 3/2007 | Rains, Jr. et al. | |
| 2007/0070621 A1 | 3/2007 | Rivas et al. | |
| 2007/0096118 A1 | 5/2007 | Mahalingam et al. | |
| 2007/0138978 A1 | 6/2007 | Rains, Jr. et al. | |
| 2007/0153518 A1 | 7/2007 | Chen | |
| 2007/0170454 A1 | 7/2007 | Andrews | |
| 2007/0183152 A1 | 8/2007 | Hauck et al. | |
| 2007/0228999 A1 | 10/2007 | Kit | |
| 2008/0002035 A1 | 1/2008 | Yoshida | |
| 2008/0020235 A1 | 1/2008 | Parce et al. | |
| 2008/0024067 A1 | 1/2008 | Ishibashi | |
| 2008/0030974 A1 | 2/2008 | Abu-Ageel | |
| 2008/0043480 A1 | 2/2008 | Kong | |
| 2008/0084706 A1 | 4/2008 | Roshan et al. | |
| 2008/0094835 A1 | 4/2008 | Marra et al. | |
| 2008/0106887 A1 | 5/2008 | Salsbury et al. | |
| 2008/0211419 A1 * | 9/2008 | Garrity | 315/224 |
| 2008/0224025 A1 | 9/2008 | Lyons et al. | |
| 2008/0237540 A1 | 10/2008 | Dubrow | |
| 2008/0246017 A1 | 10/2008 | Gillies et al. | |
| 2008/0291670 A1 | 11/2008 | Rains | |
| 2008/0315784 A1 | 12/2008 | Tseng | |
| 2009/0003002 A1 | 1/2009 | Sato | |
| 2009/0034292 A1 | 2/2009 | Pokrovskiy et al. | |
| 2009/0162011 A1 | 6/2009 | Coe-Sullivan et al. | |
| 2009/0195186 A1 | 8/2009 | Guest et al. | |
| 2009/0268461 A1 | 10/2009 | Deak et al. | |
| 2009/0295266 A1 | 12/2009 | Ramer et al. | |
| 2009/0296368 A1 | 12/2009 | Ramer | |
| 2009/0302730 A1 | 12/2009 | Carroll et al. | |
| 2010/0002414 A1 | 1/2010 | Meir et al. | |
| 2010/0002453 A1 | 1/2010 | Wu et al. | |
| 2010/0053970 A1 | 3/2010 | Sato et al. | |
| 2010/0053977 A1 | 3/2010 | Chen | |
| 2010/0123155 A1 | 5/2010 | Pickett et al. | |
| 2010/0124058 A1 | 5/2010 | Miller | |
| 2010/0276638 A1 | 11/2010 | Liu et al. | |
| 2010/0301728 A1 | 12/2010 | Helbing et al. | |
| 2011/0095686 A1 | 4/2011 | Falicoff et al. | |
| 2011/0140593 A1 | 6/2011 | Negley et al. | |
| 2011/0175528 A1 | 7/2011 | Rains, Jr. et al. | |
| 2011/0176316 A1 | 7/2011 | Phipps et al. | |
| 2012/0176804 A1 * | 7/2012 | Bohler et al. | 362/373 |

OTHER PUBLICATIONS

Entire prosecution history of U.S. Appl. No. 12/729,788, filed Mar. 23, 2010, entitled "Tubular Lighting Products Using Solid State Source and Semiconductor Nanophosphor, e.g. for Florescent Tube Replacement."

United States Office Action issued in U.S. Appl. No. 12/729,788 dated Feb. 17, 2012.

United States Office Action issued in U.S. Appl. No. 13/040,395 dated Feb. 8, 2012.

United States Office Action issued in U.S. Appl. No. 12/729,788 dated Sep. 13, 2011.

United States Office Action issued in U.S. Appl. No. 12/729,788 dated May 11, 2011.

Pradhan, Narayan, et al., "An Alternative of CdSe Nanocrystal Emitters: Pure and Tunable Impurity Emissions in ZnSe Nonocrystals", Nov. 24, 2005, pp. 17586-17587, J. A, Chem, Soc. Communications, web publication.

"Energy Star Program Requirements for Solid State Lighting Luminaires Eligibility Criteria—Version 1.0", Manual, Sep. 12, 2007.

Yin, Yadong and A. Paul Alivisatos, "Colloidal nanocrystal sythesis and the organic-inorganic interface", Insight Review, Sep. 25, 2005, pp. 664-670, Nature vol. 437.

"Final Report: Highly Bright, Heavy Metal-Free, and Stable Doped Semiconductor Nanophosphors for Economical Solid State Lighting Alternatives", Report, Nov. 12, 2009, pp. 1-3, National Center for Environmental Research, web publication.

"Solid-State Lighting: Development of White LEDs Using Nanophosphor-InP Blends", Report, Oct. 26, 2009, p. 1, U.S. Department of Energy—Energy Efficiency and Renewable Energy, web publication.

"Solid-State Lighting: Improved Light Extraction Efficiencies of White pc-LEDs for SSL by Using Non-Toxic, Non-Scattering, Bright, and Stable Doped ZnSe Quantum Dot Nanophosphors (Phase I)", Report, Oct. 26, 2009, pp. 1-2, U.S. Department of Energy—Energy Efficiency and Renewable Energy, web publication.

"Chemistry—All in the Dope", Editor's Choice, Dec. 9, 2005, Science, vol. 310, p. 1, AAAS, web publication.

"D-dots: Heavy Metal Free Doped Semiconductor Nanocrystals", Technical Specifications, etc. Dec. 1, 2009, pp. 1-2, NN-LABS, LLC

(56) References Cited

OTHER PUBLICATIONS (Nanomaterials & Nanofabrication Laboratories), CdSe/ZnS Semiconductor Nanocrystals, web publication.
U.S. Appl. No. 12/629,614, filed Dec. 2, 2009 with Official Filing Receipt and New Utility Trasmittal.
V. Ya et al., "On the Viscosity of Rarefied Gas Suspensions Containing Nanoparticles," Doklady Physics, vol. 48, No. 10, 2003, pp. 583-586.
LED Lumen-Starr Lamp Tubes; LED LS-1007; DM Technology & Energy, Inc.
United States Notice of Allowance issued in U.S. Appl. No. 13/040,395 dated Aug. 15, 2012.
United States Notice of Allowance issued in U.S. Appl. No. 12/697,596 dated Apr. 2, 2012.
United States Office Action, issued in U.S. Appl. No. 13/040,395, dated Feb. 8, 2012.
United States Notice of Allowance, issued in U.S. Appl. No. 12/697,596, dated Dec. 16, 2011.
United States Office Action issued in U.S. App. No. 12/729,788 dated May 11, 2011.
International Search Report and the Written Opinion of the International Searching Authority issued in International Patent Application No. PCT/US2010/028159 dated Jun. 1, 2010.
International Search Report and Written Opinion of the International Searching Authority issued in International Patent Application No. PCT/US2011/027179 dated Jul. 14, 2011.
United States Notice of Allowance issued in U.S. Appl. No. 12/940,634 dated Aug. 10, 2011.
Entire Prosecution history of U.S. Appl. No. 12/697,596, filed Feb. 1, 2010 entitled Lamp Using Solid State Source and Doped Semiconductor Nanophosphor.
Entire Prosecution history of U.S. Appl. No. 13/040,395, filed Mar. 4, 2011 entitled Lamp Using Solid State Source and Doped Semiconductor Nanophosphor.
US Office Action issued in U.S. Appl. No. 12/729,788 mailed Dec. 24, 2012.
Office Action mailed Sep. 24, 2012 issued by the U.S. Patent Office in U.S. Appl. No. 12/729,788.
International Preliminary Report on Patentability mailed Oct. 4, 2012 issued in corresponding International Application PCT/US2011/027179.
International Preliminary Report on Patentability and Written Opinion issued in International Patent Application No. PCT/US2010/028159 dated Aug. 16, 2012.
Mike Rutherford, opinion letter dated Sep. 10, 2013, regarding US Patent No. 7,723,744 by Gillies.
Mike Rutherford, opinion letter dated Sep. 8, 2013, regarding US Patent No. 6,734,465 by Taskar.
Notice of Allowance issued in U.S. Appl. No. 13/040,395 dated Oct. 10, 2013.
Non-final Office Action issued in U.S. Appl. No. 12/729,788 dated Oct. 7, 2013.
Final Office Action dated Mar. 21, 2014 in U.S. Appl. No. 12/729,788, filed Mar. 23, 2010.
Notice of Allowance issued in U.S. Appl. No. 13/040,395, dated Mar. 3, 2014.

* cited by examiner

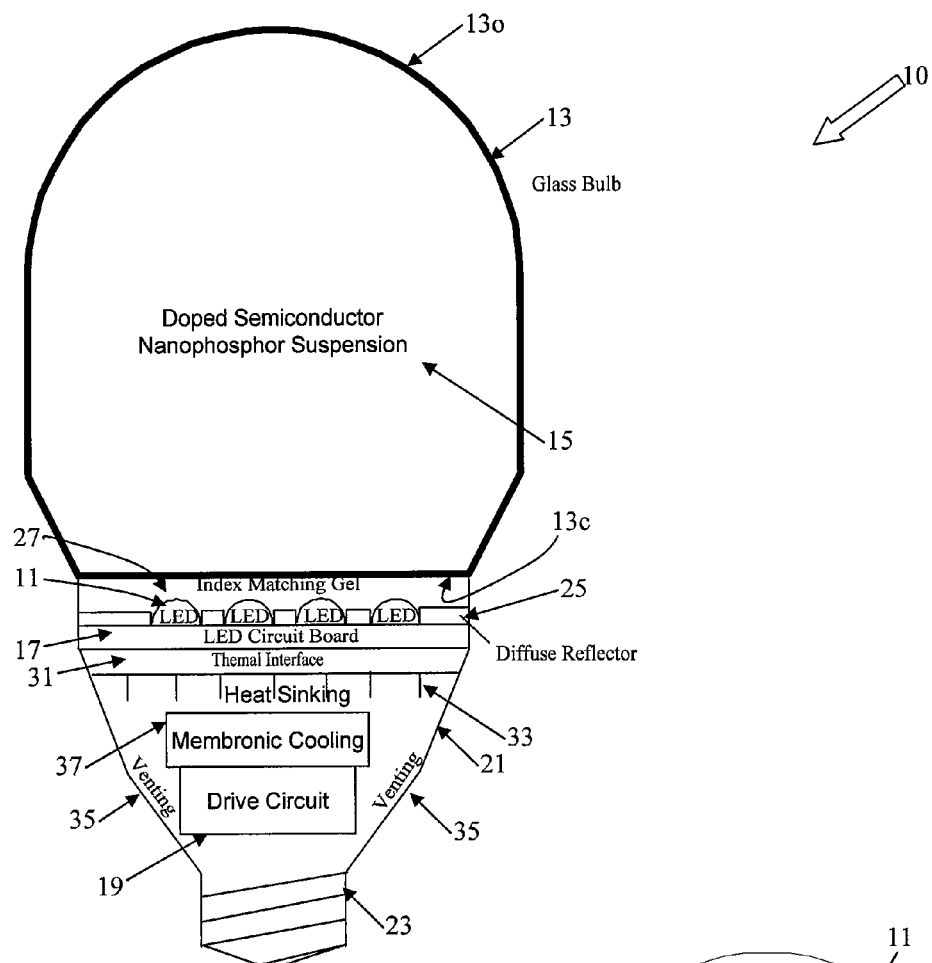
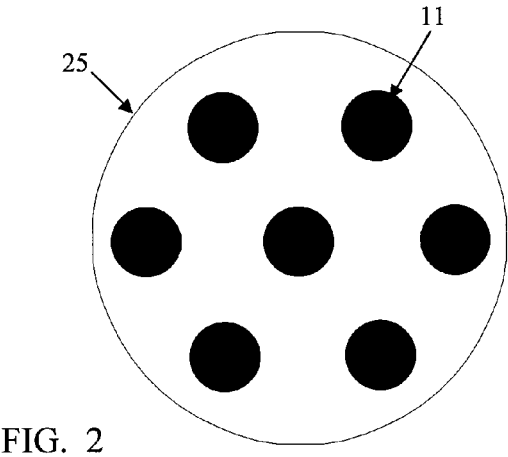
FIG. 1
FIG. 2

LAMP USING SOLID STATE SOURCE

RELATED APPLICATIONS

This application is a Continuation of U.S. patent application Ser. No. 13/040,395, filed on Mar. 4, 2011, which is a Continuation of U.S. patent application Ser. No. 12/697,596 filed on Feb. 1, 2010, the contents of the entire disclosures of both of those applications being incorporated herein entirely by reference.

BACKGROUND

Recent years have seen a rapid expansion in the performance of solid state lighting devices such as light emitting devices (LEDs); and with improved performance, there has been an attendant expansion in the variety of applications for such devices. For example, rapid improvements in semiconductors and related manufacturing technologies are driving a trend in the lighting industry toward the use of light emitting diodes (LEDs) or other solid state light sources to produce light for general lighting applications to meet the need for more efficient lighting technologies and to address ever increasing costs of energy along with concerns about global warming due to consumption of fossil fuels to generate energy. LED solutions also are more environmentally friendly than competing technologies, such as compact fluorescent lamps, for replacements for traditional incandescent lamps.

The actual solid state light sources, however, produce light of specific limited spectral characteristics. To obtain white light of a desired characteristic and/or other desirable light colors, one approach uses sources that produce light of two or more different colors or wavelengths and one or more optical processing elements to combine or mix the light of the various wavelengths to produce the desired characteristic in the output light. In recent years, techniques have also been developed to shift or enhance the characteristics of light generated by solid state sources using phosphors, including for generating white light using LEDs. Phosphor based techniques for generating white light from LEDs, currently favored by LED manufacturers, include UV or Blue LED pumped phosphors. In addition to traditional phosphors, semiconductor nanophosphors have been used more recently. The phosphor materials may be provided as part of the LED package (on or in close proximity to the actual semiconductor chip), or the phosphor materials may be provided remotely (e.g. on or in association with a macro optical processing element such as a diffuser or reflector outside the LED package). The remote phosphor based solutions have advantages, for example, in that the color characteristics of the fixture output are more repeatable, whereas solutions using sets of different color LEDs and/or lighting fixtures with the phosphors inside the LED packages tend to vary somewhat in light output color from fixture to fixture, due to differences in the light output properties of different sets of LEDs (due to lax manufacturing tolerances of the LEDs).

Hence, solid state lighting technologies have advanced considerably in recent years, and such advances have encompassed any number of actual LED based lamp products as well as a variety of additional proposals for LED based lamps. However, there is still room for further improvement in the context of solid state lamp products that are compatible with existing standardized light sockets and therefore might be adopted as replacements for conventional incandescent lamps, compact fluorescent lamps, or other similar older technology lamps.

For example, there is always a need for techniques to still further improve efficiency of solid state lamps, to reduce energy consumption. Also, any new solution should provide a light output distribution that generally conforms to that of the standard lamp it may replace, so as to provide a light output of color, intensity and distribution that meets or exceeds expectations arising from the older replaced technologies. As another example of a desirable characteristic for a solid state lamp, for general lighting applications, it is desirable to consistently provide light outputs of acceptable characteristics (e.g. white light of a desired color rendering index and/or color temperature) in a consistent repeatable manner from one instance of a lamp product to another.

Of course, to be commercially competitive with alternative lamp technologies requires an elegant overall solution. For example, the product should be as simple as possible so as to allow relatively low cost manufacturing. Relatively acceptable/pleasing form factors similar to those of well accepted incandescent lamps may be desirable. Solid state devices have advantages of relatively high dependability and long life. However, within the desired lamp form factor/configuration, there are a variety of technical issues relating to use of solid state devices that still must be met, such as efficient electrical drive of the solid state light emitters, efficient processing of the light for the desired output and/or adequate dissipation of the heat that the solid state devices generate.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 a cross-sectional view of a first example of a solid state lamp, for lighting applications, which uses a solid state source and one or more doped nanophosphors pumped by energy from the source to produce visible light.

FIG. 2 is a plan view of the LEDs and reflector of the lamp of FIG. 1.

DETAILED DESCRIPTION

Figure 3A:
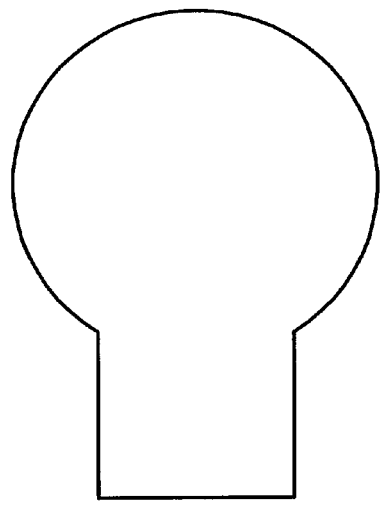
FIGS. 3A to 3C are cross-sectional views of several alternate examples of the glass bulb as may be used in place of the bulb in the exemplary lamp of FIG. 1.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples of solid state lamps disclosed herein may be used in common lighting fixtures, floor lamps and table lamps, or the like, e.g. as replacements for incandescent or compact fluorescent lamps. Reference now is made in detail to the examples illustrated in the accompanying drawings and discussed below.

FIG. 1 illustrates the first example of a solid state lamp 10, in cross section. The exemplary lamp 10 may be utilized in a variety of lighting applications. The lamp, for example includes a solid state source for producing electromagnetic energy. The solid state source is a semiconductor based structure for emitting electromagnetic energy of one or more wavelengths within the range. In the example, the source comprises one or more light emitting diode (LED) devices, although other semiconductor devices might be used. Hence, in the example of FIG. 1, the source takes the form of a number of LEDs 11.

It is contemplated that the LEDs 11 could be of any type rated to emit energy of wavelengths from the blue/green region around 460 nm down into the UV range below 380 nm. As discussed below, the exemplary nanophosphors have absorption spectra having upper limits around 430 nm, although other doped semiconductor nanophosphors may have somewhat higher limits on the wavelength absorption spectra and therefore may be used with LEDs or other solid state devices rated for emitting wavelengths as high as say 460 nm. In the specific examples, particularly those for white light lamp applications, the LEDs 11 are near UV LEDs rated for emission somewhere in the 380-420 nm range, although UV LEDs could be used alone or in combination with near UV LEDs even with the exemplary nanophosphors. A specific example of a near UV LED, used in several of the specific white lamp examples, is rated for 405 nm emission.

The structure of a LED includes a semiconductor light emitting diode chip, within a package or enclosure. A transparent portion (typically formed of glass, plastic or the like), of the package that encloses the chip, allows for emission of the electromagnetic energy in the desired direction. Many such source packages include internal reflectors to direct energy in the desired direction and reduce internal losses. Each LED 11 is rated for emission somewhere in the range at or below 460 nm. For a white light lamp application, the LEDs would be rated to emit near UV electromagnetic energy of a wavelength in the 380-420 nm range, such as 405 nm. Semiconductor devices such as the LEDs 11 exhibit emission spectra having a relatively narrow peak at a predominant wavelength, although some such devices may have a number of peaks in their emission spectra. Often, manufacturers rate such devices with respect to the intended wavelength of the predominant peak, although there is some variation or tolerance around the rated value, from device to device. LED devices, such as devices 11, for use in a lamp 10, will have a predominant wavelength in the range at or below 460 nm. For example, each LED 11 in the example of FIG. 1 may rated for a 405 nm output, which means that it has a predominant peak in its emission spectra at or about 405 nm (within the manufacturer's tolerance range of that rated wavelength value). The lamp 10, however, may use devices that have additional peaks in their emission spectra. The structural configuration of the LEDs 11 of the solid state source is presented above by way of example only.

One or more doped semiconductor nanophosphors are used in the lamp 10 to convert energy from the source into visible light of one or more wavelengths to produce a desired characteristic of the visible light output of the lamp. The doped semiconductor nanophosphors are remotely deployed, in that they are outside of the individual device packages or housings of the LEDs 11. For this purpose, the exemplary lamp includes a container formed of optically transmissive material coupled to receive near UV electromagnetic energy from the LEDs 11 forming the solid state source. The container contains a material, which at least substantially fills the interior volume of the container. For example, if a liquid is used, there may be some gas in the container as well, although the gas should not include oxygen as oxygen tends to degrade the nanophosphors. In this example, the lamp includes at least one doped semiconductor nanophosphor dispersed in the material in the container.

The material may be a solid, although liquid or gaseous materials may help to improve the florescent emissions by the nanophosphors in the material. For example, alcohol, oils (synthetic, vegetable, silicon or other oils) or other liquid media may be used. A silicone material, however, may be cured to form a hardened material, at least along the exterior (to possibly serve as an integral container), or to form a solid throughout the intended volume. If hardened silicon is used, however, a glass container still may be used to provide an oxygen barrier to reduce nanophosphor degradation due to exposure to oxygen.

If a gas is used, the gaseous material, for example, may be hydrogen gas, any of the inert gases, and possibly some hydrocarbon based gases. Combinations of one or more such types of gases might be used.

Hence, although the material in the container may be a solid, further discussion of the examples will assume use of a liquid or gaseous material. The lamp 10 in the first example includes a glass bulb 13. In some later examples, there is a separate container, and the glass bulb encloses the container. In this first example, however, the glass of the bulb 13 serves as the container. The container wall(s) are transmissive with respect to at least a substantial portion of the visible light spectrum. For example, the glass of the bulb 13 will be thick enough (as represented by the wider lines), to provide ample strength to contain a liquid or gas material if used to bear the doped semiconductor nanophosphors in suspension, as shown at 15. However, the material of the bulb will allow transmissive entry of energy from the LEDs 11 to reach the nanophosphors in the material 15 and will allow transmissive output of visible light principally from the excited nanophosphors.

The glass bulb/container 13 receives energy from the LEDs 11 through a surface of the bulb, referred to here as an optical input coupling surface 13c. The example shows the surface 13c as a flat surface, although obviously outer contours may be used. Light output from the lamp 10 emerges through one or more other surfaces of the bulb 13, referred to here as output surface 13o. In the example, the bulb 13 here is glass, although other appropriate transmissive materials may be used. For a diffuse outward appearance of the bulb, the output surface(s) 13o may be frosted white or translucent, although the optical input coupling surface 13c might still be transparent to reduce reflection of energy from the LEDs 11 back towards the LEDs. Alternatively, the output surface 13o may be transparent.

For some lighting applications where a single color is desirable rather than white, the lamp might use a single type of nanophosphor in the material. For a yellow 'bug lamp' type application, for example, the one nanophosphor would be of a type that produces yellow emission in response to pumping energy from the LEDs. For a red lamp type application, as another example, the one nanophosphor would be of a type that produces predominantly red light emission in response to pumping energy from the LEDs. The upper limits of the absorption spectra of the exemplary nanophosphors are all at or around 430 nm, therefore, the LEDs used in such a monochromatic lamp would emit energy in a wavelength range of 430 nm and below. In many examples, the lamp produces white light of desirable characteristics using a number of doped semiconductor nanophosphors, and further discussion of the examples including that of FIG. 1 will concentrate on such white light implementations.

Hence for further discussion, we will assume that the container formed by the glass bulb 13 is at least substantially filled with a liquid or gaseous material 15 bearing a number of different doped semiconductor nanophosphors dispersed in the liquid or gaseous material 15. Also, for further discussion, we will assume that the LEDs 11 are near UV emitting LEDs, such as 405 nm LEDs or other types of LEDs rated to emit somewhere in the wavelength range of 380-420 nm. Each of the doped semiconductor nanophosphors is of a type excited in response to near UV electromagnetic energy from the LEDs 11 of the solid state source. When so excited, each doped semiconductor nanophosphor re-emits visible light of a different spectrum. However, each such emission spectrum has substantially no overlap with absorption spectra of the doped semiconductor nanophosphors. When excited by the electromagnetic energy received from the LEDs 11, the doped semiconductor nanophosphors together produce visible light output for the lamp 10 through the exterior surface(s) of the glass bulb 13.

The liquid or gaseous material 15 with the doped semiconductor nanophosphors dispersed therein appears at least substantially clear when the lamp 10 is off. For example, alcohol, oils (synthetic, vegetable or other oils) or other clear liquid media may be used, or the liquid material may be a relatively clear hydrocarbon based compound or the like. Exemplary gases include hydrogen gas, clear inert gases and clear hydrocarbon based gases. The doped semiconductor nanophosphors in the specific examples described below absorb energy in the near UV and UV ranges. The upper limits of the absorption spectra of the exemplary nanophosphors are all at or around 430 nm, however, the exemplary nanophosphors are relatively insensitive to other ranges of visible light often found in natural or other ambient white visible light. Hence, when the lamp 10 is off, the doped semiconductor nanophosphors exhibit little or no light emissions that might otherwise be perceived as color by a human observer. Even though not emitting, the particles of the doped semiconductor nanophosphors may have some color, but due to their small size and dispersion in the material, the overall effect is that the material 15 appears at least substantially clear to the human observer, that is to say it has little or no perceptible tint.

The LEDs 11 are mounted on a circuit board 17. The exemplary lamp 10 also includes circuitry 19. Although drive from DC sources is contemplated for use in existing DC lighting systems, the examples discussed in detail utilize circuitry configured for driving the LEDs 11 in response to alternating current electricity, such as from the typical AC main lines. The circuitry may be on the same board 17 as the LEDs or disposed separately within the lamp 10 and electrically connected to the LEDs 11. Electrical connections of the circuitry 19 to the LEDs and the lamp base are omitted here for simplicity. Several examples of the drive circuitry 19 are discussed later with regard to FIGS. 11, 12 and 14-16.

A housing 21 at least encloses the circuitry 19. In the example, the housing 21 together with a lamp base 23 and a face of the glass bulb 13 also enclose the LEDs 11. The lamp 10 has a lighting industry standard lamp base 23 mechanically connected to the housing and electrically connected to provide alternating current electricity to the circuitry 19 for driving the LEDs 11.

The lamp base 23 may be any common standard type of lamp base, to permit use of the lamp 10 in a particular type of lamp socket. Common examples include an Edison base, a mogul base, a candelabra base and a bi-pin base. The lamp base may have electrical connections for a single intensity setting or additional contacts in support of three-way intensity setting/dimming.

The exemplary lamp 10 of FIG. 1 may include one or more features intended to prompt optical efficiency. Hence, as illustrated, the lamp 10 includes a diffuse reflector 25. The circuit board 17 has a surface on which the LEDs 11 are mounted, so as to face toward the light receiving surface of the glass bulb 13 containing the nanophosphor bearing material 15. The reflector 25 covers parts of that surface of the circuit board 17 in one or more regions between the LEDs 11. FIG. 2 is a view of the LEDs 11 and the reflector 25. When excited, the nanophosphors in the material 15 emit light in many different directions, and at least some of that light would be directed back toward the LEDs 11 and the circuit board 17. The diffuse reflector 25 helps to redirect much of that light back through the glass bulb 13 for inclusion in the output light distribution.

The lamp 10 may use one or any number of LEDs 11 sufficient to provide a desired output intensity. The example of FIG. 2 shows seven LEDs 11, although the lamp 10 may have more or less LEDs than in that example.

There may be some air gap between the emitter outputs of the LEDs 11 and the facing optical coupling surface 13c of the glass bulb container 13 (FIG. 1). However, to improve outcoupling of the energy from the LEDs 11 into the light transmissive glass of the bulb 13, it may be helpful to provide an optical grease, glue or gel 27 between the surface 13c of the glass bulb 13 and the optical outputs of the LEDs 11. This index matching material 27 eliminates any air gap and provides refractive index matching relative to the material of the glass bulb container 13.

The examples also encompass technologies to provide good heat conductivity so as to facilitate dissipation of heat generated during operation of the LEDs 11. Hence, the exemplary lamp 10 includes one or more elements forming a heat dissipater within the housing for receiving and dissipating heat produced by the LEDs 11. Active dissipation, passive dissipation or a combination thereof may be used. The lamp 10 of FIG. 1, for example, includes a thermal interface layer 31 abutting a surface of the circuit board 17, which conducts heat from the LEDs and the board to a heat sink arrangement 33 shown by way of example as a number of fins within the housing 21. The housing 21 also has one or more openings or air vents 35, for allowing passage of air through the housing 21, to dissipate heat from the fins of the heat sink 33.

The thermal interface layer 31, the heat sink 33 and the vents 35 are passive elements in that they do not consume additional power as part of their respective heat dissipation functions. However, the lamp 10 may include an active heat dissipation element that draws power to cool or otherwise dissipate heat generated by operations of the LEDs 11. Examples of active cooling elements include fans, Peltier devices or the like. The lamp 10 of FIG. 1 utilizes one or more membronic cooling elements. A membronic cooling element comprises a membrane that vibrates in response to electrical power to produce an airflow. An example of a membronic cooling element is a SynJet® sold by Nuventix. In the example of FIG. 1, the membronic cooling element 37 operates like a fan or air jet for circulating air across the heat sink 33 and through the air vents 35.

In the orientation illustrated in FIG. 1, white light from the semiconductor nanophosphor excitation is dispersed upwards and laterally, for example, for omni-directional lighting of a room from a table or floor lamp. The orientation shown, however, is purely illustrative. The lamp 10 may be oriented in any other direction appropriate for the desired lighting application, including downward, any sideways direction, various intermediate angles, etc.

Figure 3B:
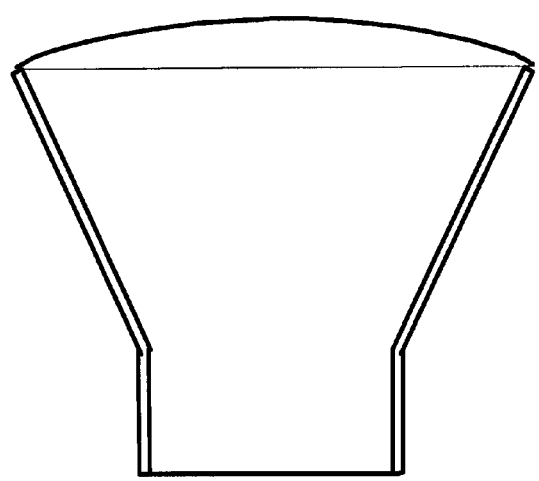
Figure 3C:
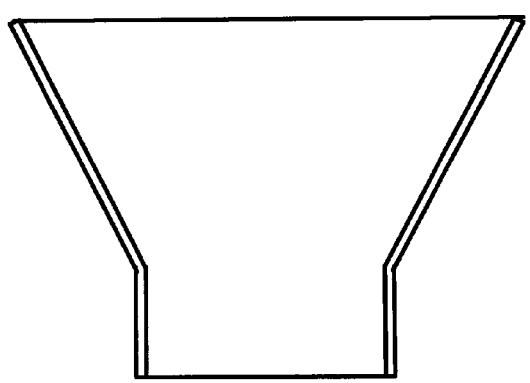

In the example of FIG. 1, the glass bulb 13, containing the material 15 with the doped semiconductor nanophosphors produces a wide dispersion of output light, which is relatively omni-directional (except directly downward in the illustrated orientation). Such a light output intensity distribution corresponds to that currently offered by A-lamps. Other bulb/container structures, however, may be used; and a few examples are presented in FIGS. 3A to 3C. FIG. 3A shows a globe-and-stem arrangement for A-Lamp type omni-directional lighting. FIGS. 3B and 3C show R-lamp and Par-lamp style bulbs for different directed lighting applications. As represented by the double lines, some internal surfaces of the directional bulbs may be reflective, to promote the desired output distributions.

The lamp 10 of FIG. 1 has one of several industry standard lamp bases 23, shown in the illustration as a type of screw-in base. The glass bulb 13 exhibits a form factor within standard size, and the output distribution of light emitted via the bulb 13 conforms to industry accepted specifications, for a particular type of lamp product. Those skilled in the art will appreciate that these aspects of the lamp 10 facilitate use of the lamp as a replacement for existing lamps, such as incandescent lamps and compact fluorescent lamps.

The housing 21, the base 23 and components contained in the housing 21 can be combined with a bulb/container in one of a variety of different shapes. As such, these elements together may be described as a 'light engine' portion of the lamp for generating the near UV energy. Theoretically, the engine and bulb could be modular in design to allow a user to interchange glass bulbs, but in practice the lamp is an integral product. The light engine may be standardized across several different lamp product lines. In the examples of FIGS. 1 and 3, housing 21, the base 23 and components contained in the housing 21 could be the same for A-lamps (bulb of FIG. 1 or bulb of FIG. 3A), R-lamps (bulb of FIG. 3B), Par-lamps (bulb of FIG. 3C) or other styles of lamps. A different base can be substituted for the screw base 23 shown in FIG. 1, to produce a lamp product configured for a different socket design.

As outlined above, the lamp 10 will include or have associated therewith remote semiconductor nanophosphors in a container that is external to the LEDs 11 of the solid state source. As such, the phosphors are located apart from the semiconductor chip of the LEDs 11 used in the particular lamp 10, that is to say remotely deployed.

The semiconductor nanophosphors are dispersed, e.g. in suspension, in a liquid or gaseous material 15, within a container (bulb 13 in the lamp 10 of FIG. 1). The liquid or gaseous medium preferably exhibits high transmissivity and/or low absorption to light of the relevant wavelengths, although it may be transparent or somewhat translucent. Although alcohol, oils (synthetic, vegetable, silicon or other oils) or other media may be used, in the example of FIG. 1, the medium may be a hydrocarbon material, in either a liquid or gaseous state.

In an example of a white light type lamp, the doped semiconductor nanophosphors in the material shown at 15 are of types or configurations (e.g. selected types of doped semiconductor nanophosphors) excitable by the near UV energy from LEDs 11 forming the solid state source. Together, the excited nanophosphors produce output light that is at least substantially white and has a color rendering index (CRI) of 75 or higher. The lamp output light produced by this near UV excitation of the semiconductor nanophosphors exhibits color temperature in one of several desired ranges along the black body curve. Different light lamps 10 designed for different color temperatures of white output light would use different formulations of mixtures of doped semiconductor nanophosphors. The white output light of the lamp 10 exhibits color temperature in one of four specific ranges along the black body curve listed in Table 1 below.

TABLE 1

Nominal Color Temperatures and Corresponding Color Temperature Ranges

| Nominal Color Temp. (° Kelvin) | Color Temp. Range (° Kelvin) |
|---|---|
| 2700 | 2725 ± 145 |
| 3000 | 3045 ± 175 |
| 3500 | 3465 ± 245 |
| 4000 | 3985 ± 275 |

Figure 4:
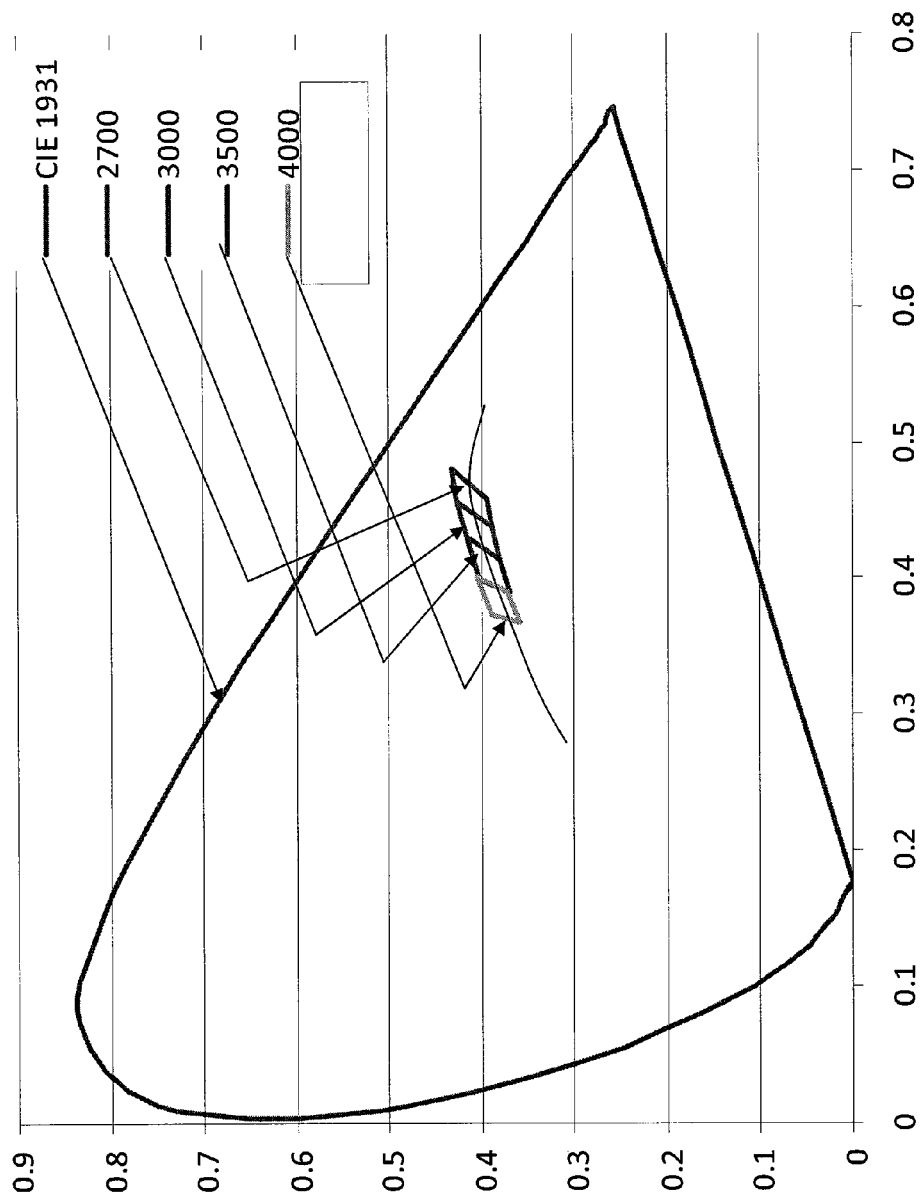
FIG. 4 is a color chart showing the black body curve and tolerance quadrangles along that curve for chromaticities corresponding to several desired color temperature ranges for lamps configured for white light applications.

In Table 1, each nominal color temperature value represents the rated or advertised temperature as would apply to particular lamp products having an output color temperature within the corresponding range. The color temperature ranges fall along the black body curve. FIG. 4 shows the outline of the CIE 1931 color chart, and the curve across a portion of the chart represents a section of the black body curve that includes the desired CIE color temperature (CCT) ranges. The light may also vary somewhat in terms of chromaticity from the coordinates on the black body curve. The quadrangles shown in the drawing represent the respective ranges of chromaticity for the nominal CCT values. Each quadrangle is defined by the range of CCT and the distance from the black body curve. Table 2 below provides chromaticity specifications for the four color temperature ranges. The x, y coordinates define the center points on the black body curve and the vertices of the tolerance quadrangles diagrammatically illustrated in the color chart of FIG. 4.

TABLE 2

Chromaticity Specification for the Four Nominal Values/CCT Ranges

| CCT Range | | | | | | | |
|---|---|---|---|---|---|---|---|
| 2725 ± 145 | | 3045 ± 175 | | 3465 ± 245 | | 3985 ± 275 | |
| Nominal CCT | | | | | | | |
| 2700° K | | 3000° K | | 3500° K | | 4000° K | |
| x | y | x | y | x | y | x | y |
| Center point | | | | | | | |
| 0.4578 | 0.4101 | 0.4338 | 0.4030 | 0.4073 | 0.3917 | 0.3818 | 0.3797 |
| 0.4813 | 0.4319 | 0.4562 | 0.4260 | 0.4299 | 0.4165 | 0.4006 | 0.4044 |
| Tolerance Quadrangle | | | | | | | |
| 0.4562 | 0.426 | 0.4299 | 0.4165 | 0.3996 | 0.4015 | 0.3736 | 0.3874 |
| 0.4373 | 0.3893 | 0.4147 | 0.3814 | 0.3889 | 0.369 | 0.367 | 0.3578 |
| 0.4593 | 0.3944 | 0.4373 | 0.3893 | 0.4147 | 0.3814 | 0.3898 | 0.3716 |

The solid state lamp 10 could use a variety of different combinations of semiconductor nanophosphors to produce such an output. Examples of suitable materials are available from NN Labs of Fayetteville, Ark. In a specific example, one or more of the doped semiconductor nanophosphors comprise zinc selenide quantum dots doped with manganese or copper. Such nanophosphors may be provided in a silicone medium or in a hydrocarbon medium. The medium may be in a liquid or gaseous state. The selection of one or more such nanophosphors excited mainly by the low end (near UV) of the visible spectrum together with dispersion of the nanophosphors in an otherwise clear liquid or gas minimizes any potential for discoloration of the lamp 10 in its off-state that might otherwise be caused by the presence of a phosphor material.

Figure 5:
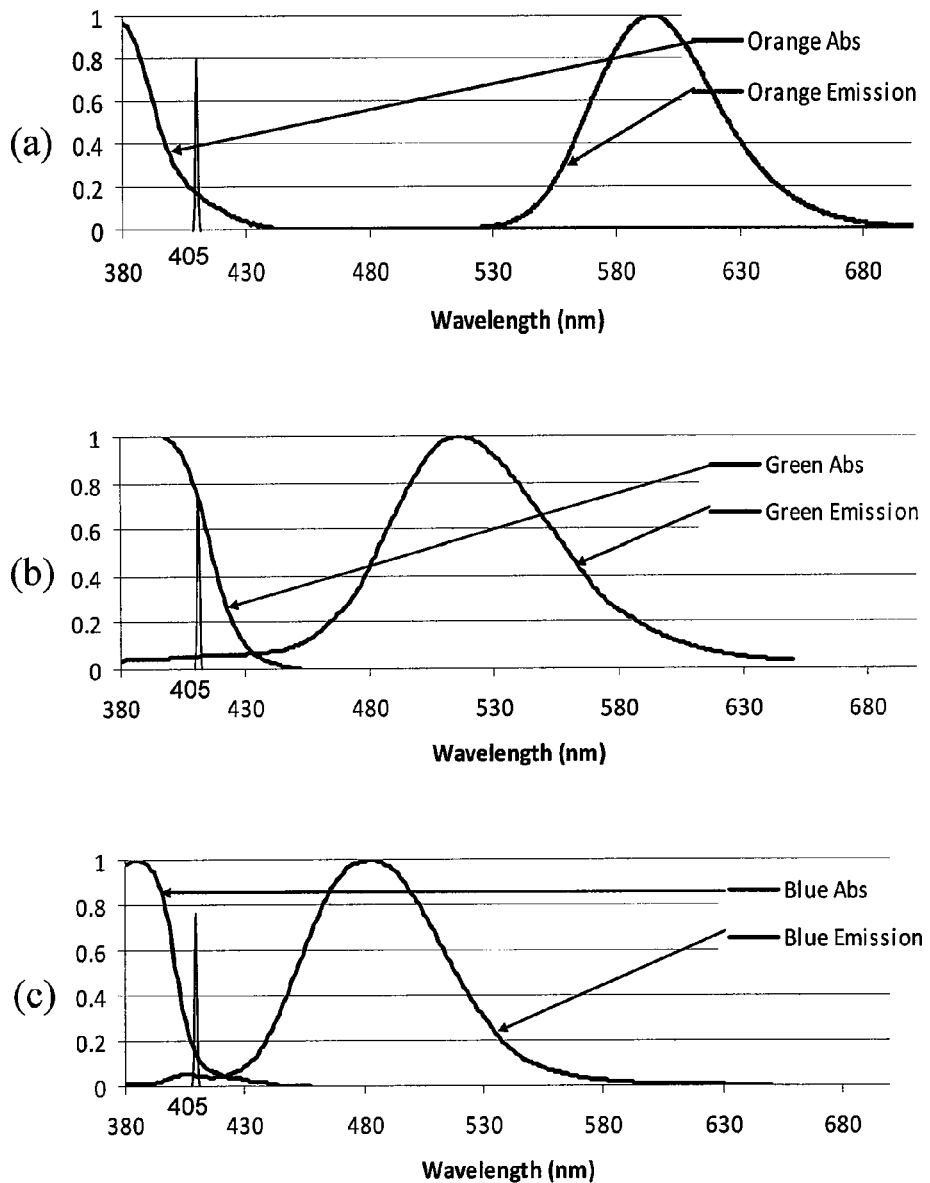
FIG. 5 is a graph of absorption and emission spectra of a number of doped semiconductor nanophosphors.

Doped semiconductor nanophosphors exhibit a large Stokes shift, that is to say from a short-wavelength range of absorbed energy up to a fairly well separated longer-wavelength range of emitted light. FIG. 5 shows the absorption and emission spectra of three examples of doped semiconductor nanophosphors. Each line of the graph also includes an approximation of the emission spectra of the 405 nm LED chip, to help illustrate the relationship of the 405 nm near UV LED emissions to the absorption spectra of the exemplary doped semiconductor nanophosphors. The illustrated spectra are not drawn precisely to scale but in a manner to provide a teaching example to illuminate our discussion here.

The top line (a) of the graph shows the absorption and emission spectra for an orange emitting doped semiconductor nanophosphor. The absorption spectrum for this first phosphor includes the 380-420 nm near UV range, but that absorption spectrum drops substantially to 0 before reaching 450 nm. As noted, the phosphor exhibits a large Stokes shift from the short wavelength(s) of absorbed light to the longer wavelengths of re-emitted light. The emission spectrum of this first phosphor has a fairly broad peak in the wavelength region humans perceive as orange. Of note, the emission spectrum of this first phosphor is well above the illustrated absorption spectra of the other doped semiconductor nanophosphors and well above its own absorption spectrum. As a result, orange emissions from the first doped semiconductor nanophosphor would not re-excite that phosphor and would not excite the other doped semiconductor nanophosphors if mixed together. Stated another way, the orange phosphor emissions would be subject to little or no phosphor re-absorption, even in mixtures containing one or more of the other doped semiconductor nanophosphors.

The next line (b) of the graph in FIG. 5 shows the absorption and emission spectra for a green emitting doped semiconductor nanophosphor. The absorption spectrum for this second phosphor includes the 380-420 nm near UV range, but that absorption spectrum drops substantially to 0 a little below 450 nm. This phosphor also exhibits a large Stokes shift from the short wavelength(s) of absorbed light to the longer wavelengths of re-emitted light. The emission spectrum of this second phosphor has a broad peak in the wavelength region humans perceive as green. Again, the emission spectrum of the phosphor is well above the illustrated absorption spectra of the other doped semiconductor nanophosphors and well above its own absorption spectrum. As a result, green emissions from the second doped semiconductor nanophosphor would not re-excite that phosphor and would not excite the other doped semiconductor nanophosphors if mixed together. Stated another way, the green phosphor emissions also should be subject to little or no phosphor re-absorption, even in mixtures containing one or more of the other doped semiconductor nanophosphors.

The bottom line (c) of the graph shows the absorption and emission spectra for a blue emitting doped semiconductor nanophosphor. The absorption spectrum for this third phosphor includes the 380-420 nm near UV range, but that absorption spectrum drops substantially to 0 between 400 and 450 nm. This phosphor also exhibits a large Stokes shift from the short wavelength(s) of absorbed light to the longer wavelengths of re-emitted light. The emission spectrum of this third phosphor has a broad peak in the wavelength region humans perceive as blue. The main peak of the emission spectrum of the phosphor is well above the illustrated absorption spectra of the other doped semiconductor nanophosphors and well above its own absorption spectrum. In the case of the blue example, there is just a small amount of emissions in the region of the phosphor absorption spectra. As a result, blue emissions from the third doped semiconductor nanophosphor would re-excite that phosphor at most a minimal amount. As in the other phosphor examples of FIG. 5, the blue phosphor emissions would be subject to relatively little phosphor re-absorption, even in mixtures containing one or more of the other doped semiconductor nanophosphors.

Examples of suitable orange, green and blue emitting doped semiconductor nanophosphors of the types generally described above relative to FIG. 5 are available from NN Labs of Fayetteville, Ark.

As explained above, the large Stokes shift results in negligible re-absorption of the visible light emitted by doped semiconductor nanophosphors. This allows the stacking of multiple phosphors. It becomes practical to select and mix two, three or more such phosphors in a manner that produces a particular desired spectral characteristic in the combined light output generated by the phosphor emissions.

Figure 6A:
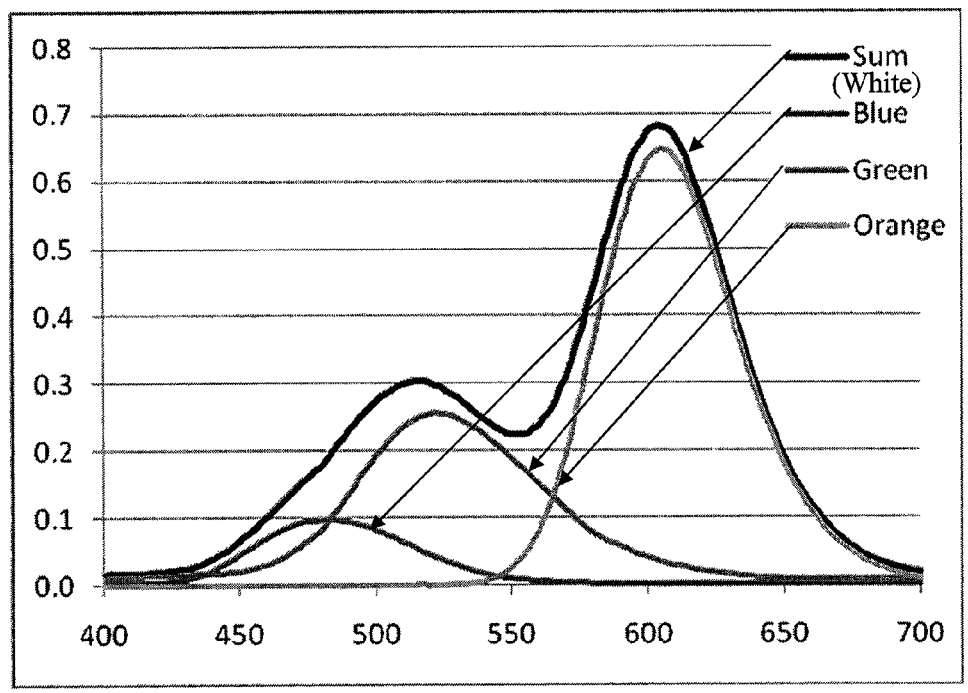
FIG. 6A is a graph of emission spectra of three of the doped semiconductor nanophosphors selected for use in an exemplary solid state light emitting lamp as well as the spectrum of the white light produced by combining the spectral emissions from those three phosphors.

FIG. 6A graphically depicts emission spectra of three of the doped semiconductor nanophosphors selected for use in an exemplary solid state light lamp as well as the spectrum of the white light produced by summing or combining the spectral emissions from those three phosphors. For convenience, the emission spectrum of the LED has been omitted from FIG. 6A, on the assumption that a high percentage of the 405 nm light from the LED is absorbed by the phosphors. Although the actual output emissions from the lamp may include some near UV light from the LED, the contribution thereof if any to the sum in the output spectrum should be relatively small.

Although other combinations are possible based on the phosphors discussed above relative to FIG. 5 or based on other doped semiconductor nanophosphor materials, the example of FIG. 6A represents emissions of blue, green and orange phosphors. The emission spectra of the blue, green and orange emitting doped semiconductor nanophosphors are similar to those of the corresponding color emissions shown in FIG. 5. Light is additive. Where the solid state lamp 10 includes the blue, green and orange emitting doped semiconductor nanophosphors as shown for example at 15 in FIG. 1, the addition of the blue, green and orange emissions produces a combined spectrum as approximated by the top or 'Sum' curve in the graph of FIG. 6A, for output from the glass bulb 13.

It is possible to add one or more additional nanophosphors, e.g. a fourth, fifth, etc., to the mixture to further improve the CRI. For example, to improve the CRI of the nanophosphor mix of FIGS. 5 and 6A, a doped semiconductor nanophosphor might be added to the mix with a broad emissions spectrum that is yellowish-green or greenish-yellow, that is to say with a peak of the phosphor emissions somewhere in the range of 540-570 nm, say at 555 nm.

Figure 6B:
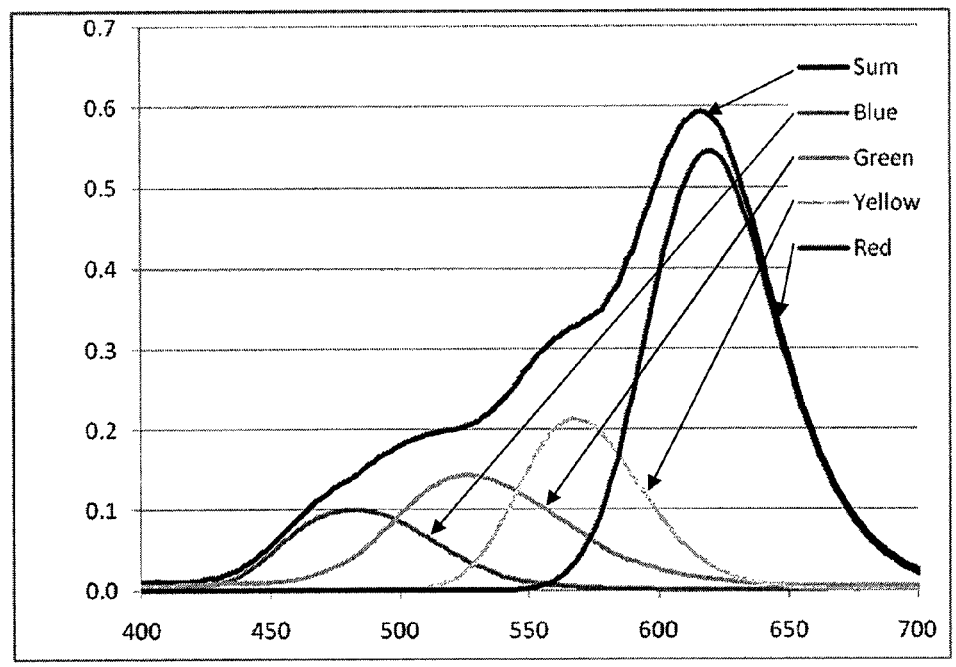
FIG. 6B is a graph of emission spectra of four doped semiconductor nanophosphors, in this case, for red, green, blue and yellow emissions, as well as the spectrum of the white light produced by combining the spectral emissions from those four phosphors.

Other mixtures also are possible, with two, three or more doped semiconductor nanophosphors. The example of FIG. 6B uses red, green and blue emitting semiconductor nanophosphors, as well as a yellow fourth doped semiconductor nanophosphor. Although not shown, the absorption spectra would be similar to those of the three nanophosphors discussed above relative to FIG. 5. For example, each absorption spectrum would include at least a portion of the 380-420 nm near UV range. All four phosphors would exhibit a large Stokes shift from the short wavelength(s) of absorbed light to the longer wavelengths of re-emitted light, and thus their emissions spectra have little or no overlap with the absorption spectra.

In this example (FIG. 6B), the blue nanophosphor exhibits an emission peak at or around 484, nm, the green nanophosphor exhibits an emission peak at or around 516 nm, the yellow nanophosphor exhibits an emission peak at or around 580, and the red nanophosphor exhibits an emission peak at or around 610 nm. The addition of these blue, green, red and yellow phosphor emissions produces a combined spectrum as approximated by the top or 'Sum' curve in the graph of FIG. 6B. The 'Sum' curve in the graph represents a resultant white light output having a color temperature of 2600° Kelvin (within the 2,725±145° Kelvin range), where that white output light also would have a CRI of 88 (higher than 75).

Various mixtures of doped semiconductor nanophosphors will produce white light emissions from solid state lamps 10 that exhibit CRI of 75 or higher. For an intended lamp specification, a particular mixture of such nanophosphors is chosen so that the light output of the lamp exhibits color temperature in one of the following specific ranges along the black body curve: 2,725±145° Kelvin; 3,045±175° Kelvin; 3,465±245° Kelvin; and 3,985±275° Kelvin. In the example shown in FIG. 6A, the 'Sum' curve in the graph produced by the mixture of blue, green and orange emitting doped semiconductor nanophosphors would result in a white light output having a color temperature of 2800° Kelvin (within the 2,725±145° Kelvin range). That white output light also would have a CRI of 80 (higher than 75).

The lamps under consideration here may utilize a variety of different structural arrangements. In the example of FIG. 1, the glass bulb 13 also served as the container for the material 15 bearing the doped semiconductor nanophosphors. For some applications and/or manufacturing techniques, it may be desirable to utilize a separate container for the doped semiconductor nanophosphors and enclose the container within a bulb (glass or the like) that provides a particular form factor and outward light bulb appearance and light distribution. It may be helpful to consider some examples of this later lamp configuration.

Figure 7:
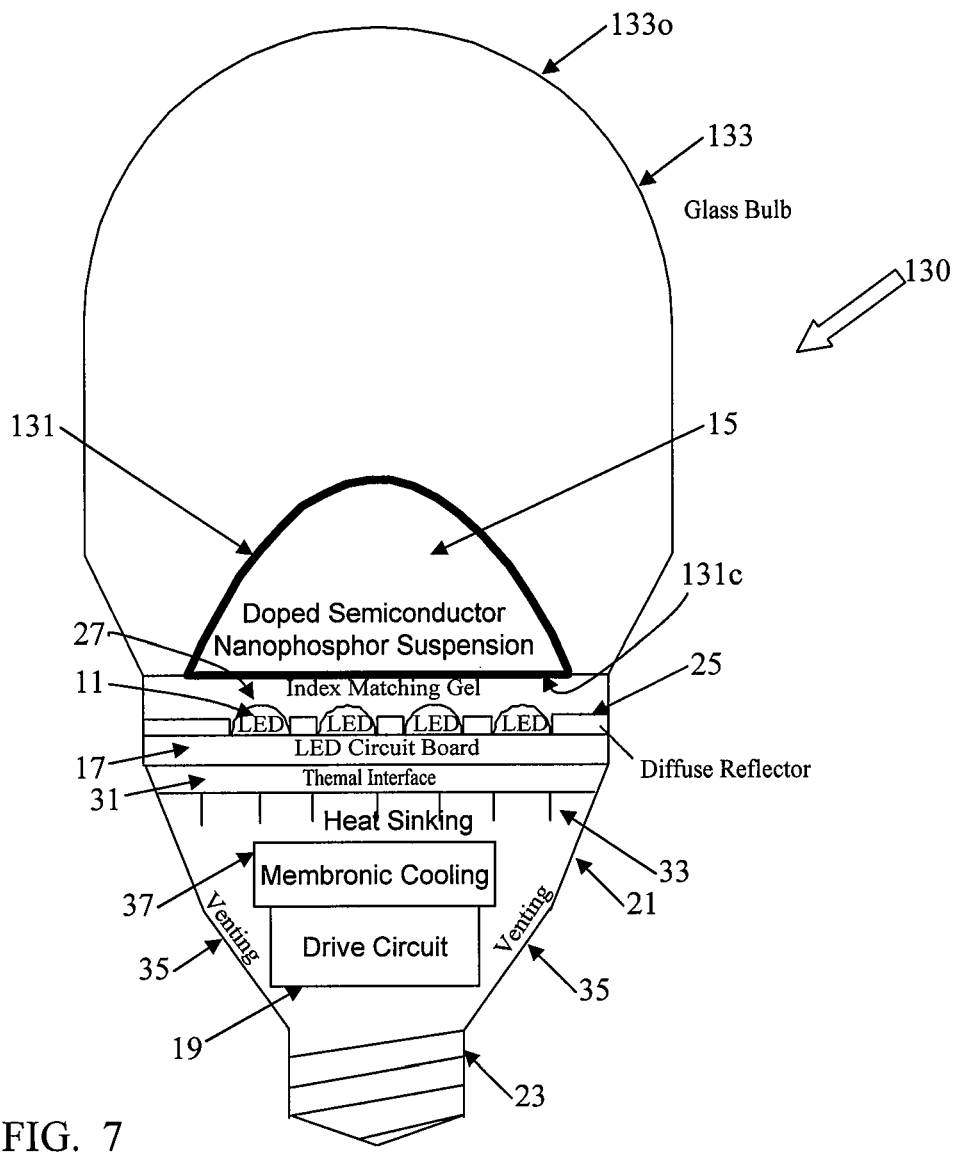
FIG. 7 is a cross-sectional view of another example of a solid state lamp, in which the glass bulb forms a light transmissive glass enclosure enclosing a separate internal container for the material bearing the nanophosphors.
Figure 8:
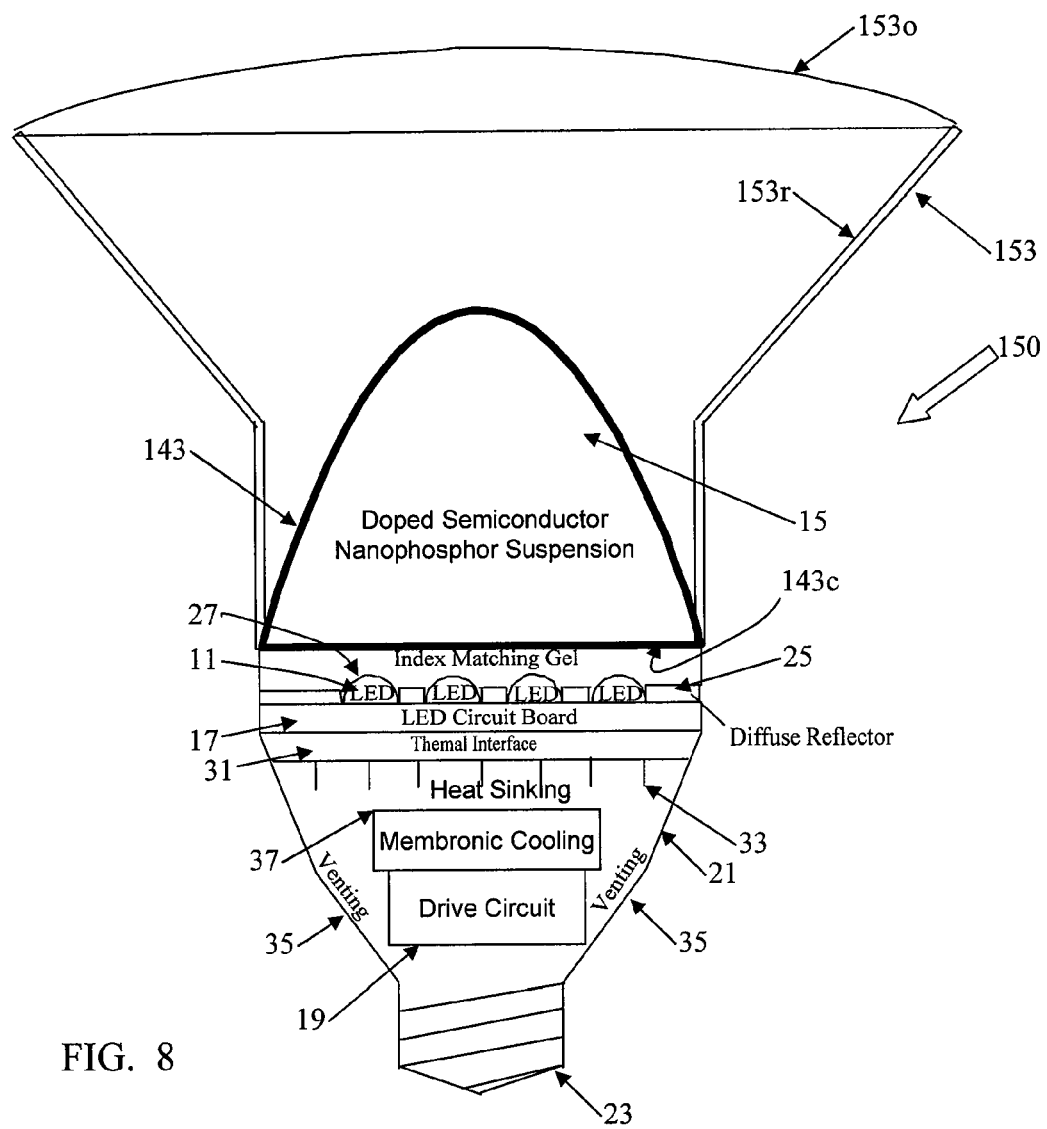
FIG. 8 is a cross-sectional view of an example of a solid state lamp, similar to that of FIG. 7, but in which the glass bulb enclosure provides a form factor and output distribution of a R-lamp.
Figure 9:
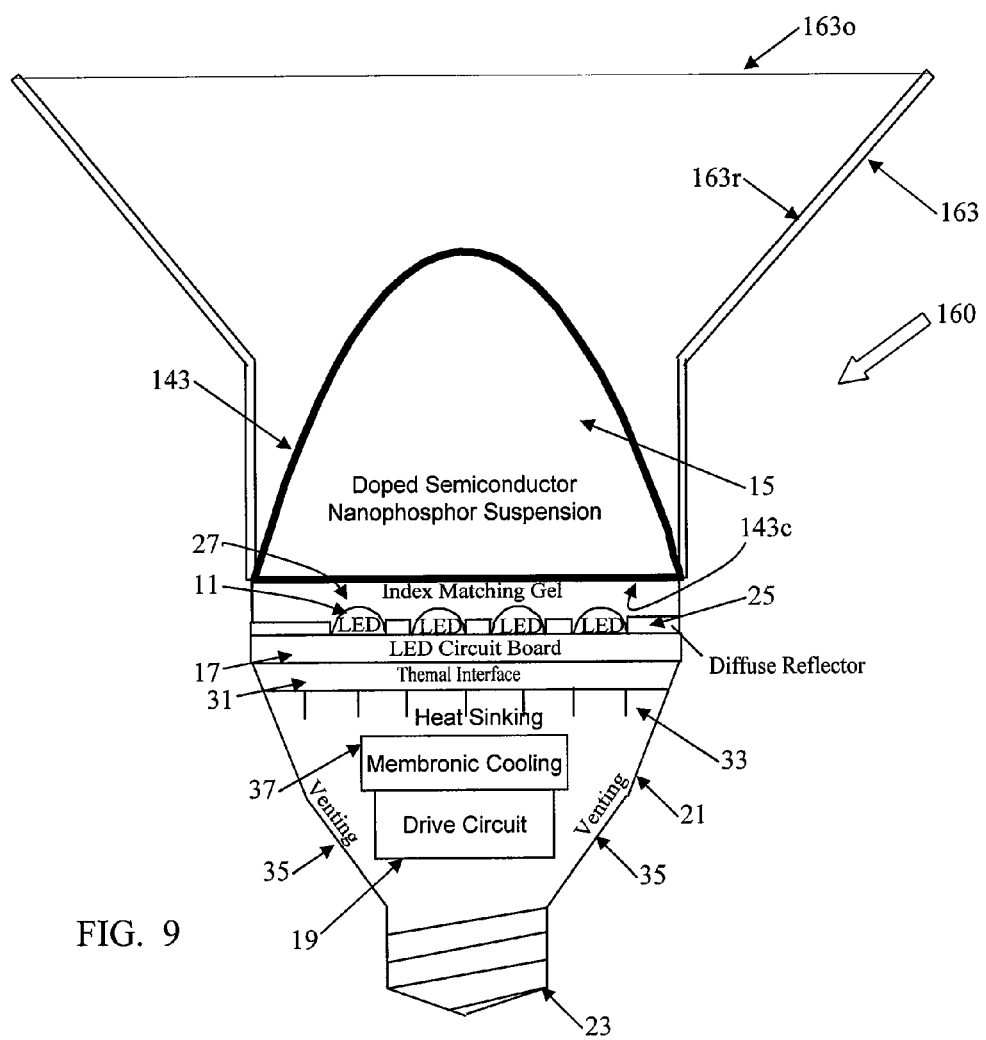
FIG. 9 is a cross-sectional view of an example of a solid state lamp, similar to that of FIG. 7, but in which the glass bulb enclosure provides a form factor and output distribution of a Par-lamp.

FIGS. 7-9 depict several examples of solid state lamps, in each of which the glass bulb forms a light transmissive glass enclosure enclosing a separate internal container for the material bearing the doped semiconductor nanophosphors. Many of the elements in these examples are the same as like numbered elements in the example of FIG. 1 and are implemented and/or operate in the various ways discussed above.

The lamp 130 of FIG. 7, for example, includes the housing 21, the base 23 and components contained in the housing 21 that form the 'light engine' portion of the lamp for generating the near UV energy, 405 nm in the specific example. The near UV energy pump doped semiconductor nanophosphors dispersed or in suspension in a gas or liquid material, as shown at 15, as in the example of FIG. 1.

In the example of FIG. 7, however, the lamp 130 includes container 131, which contains the nanophosphor bearing material 15. The container 131 may be glass. The container 131 is transmissive with respect to at least a substantial portion of the visible light, however, the material forming the container walls will be thick enough (as represented by the wider lines), to provide ample strength to contain the liquid or gas material that bears the doped semiconductor nanophosphors in suspension, as shown at 15. The material of the container 131 will allow transmissive entry of near UV light to reach the nanophosphors in the material 15 and will allow transmissive output of visible light principally from the excited nanophosphors.

The container 131 receives near UV energy from the LEDs 11 through a surface of the container, referred to here as an optical input coupling surface 131c. The example shows the surface 131c as a flat surface, although obviously other contours may be used. The optical input coupling surface 13c might be transparent to reduce reflection of near UV energy from the LEDs 11 back towards the LEDs. The surface or surfaces through which the light emerges from the container 131 may be frosted or translucent, but typically are transparent to maximize output efficiency. The container 131 may have a variety of shapes, for ease of manufacturing and/or to promote a desired distribution of light output from the lamp when combined with a particular configuration of the associated bulb.

Light from the material 15 passes out through the container wall, mainly into the interior of the bulb 133. The bulb 133 in this example is glass, but could be formed of other materials. Light output from the lamp 130 emerges through one or more outer surfaces of the bulb 133, referred to here as output surface 133o. For a diffuse outward appearance of the bulb, the output surface(s) 133o may be frosted white or translucent, although that portion of the bulb could be transparent.

The outer shape of the bulb 133 fits within the permissible dimensions for an industry standard type of lamp, such as an A-lamp in the example of FIG. 7. The bulb and/or container are configured to produce a light output distribution in accord with the appropriate industry standard. In the A-lamp example, the light output is relatively omni-directional (except directly downward in the illustrated orientation).

FIG. 8 depicts an example of a solid state lamp 150, similar to the lamp of FIG. 7, but which provides a form factor and output distribution of a R-lamp. Like the lamp of FIG. 7, however, the lamp 150 includes container as shown at 143, which contains the nanophosphor bearing material 15. The container 143 may be glass or other material. The container 143 is transmissive with respect to at least a substantial portion of the visible light, however, the material forming the container walls will be thick enough (as represented by the wider lines), to provide ample strength to contain the liquid or gas material that bears the doped semiconductor nanophosphors in suspension, as shown at 15. The material of the container 143 will allow transmissive entry of near UV light to reach the nanophosphors in the material 15 and will allow transmissive output of visible light principally from the excited nanophosphors.

The container 143 receives near UV energy from the LEDs 11 through a surface of the container, referred to here as an optical input coupling surface 143c. The example of FIG. 8 shows the surface 131c as a flat surface, although obviously other contours may be used. The optical input coupling surface 143c might be transparent to reduce reflection of near UV energy from the LEDs 11 back towards the LEDs. The surfaces through which the light emerges from the container may be frosted or translucent, but typically are transparent to maximize output efficiency. The container 143 may have a variety of shapes, for ease of manufacturing and/or to promote a desired distribution of light output from the lamp. In the example of FIG. 8, the container 143 has a shape to fit into and extend through the neck of a bulb 153 having a R-lamp bulb shape.

Light from the material 15 passes out through the container wall, mainly into the interior of the bulb 153. The bulb 153 in this example is glass, but could be formed of other materials. The bulb 153 provides a directed light output distribution. For that purpose, side surfaces of the neck and angled region of the bulb are reflective, for example, they are coated with a reflective material 153r (represented by the double sidewall lines). Light output from the lamp 150 emerges through one or more outer surfaces of the bulb 153, referred to here as output surface 153o. For the R-lamp configuration of FIG. 8, the surface 153o will have a slight outward curvature and provide a diffuse outward appearance, so as to diffuse some light out laterally a bit beyond the angles formed by the reflective sidewall surfaces of the bulb 153. The outer shape of the bulb 153 fits within the permissible dimensions for an industry standard type of lamp, such as a R-lamp in the example of FIG. 8. The bulb and/or container are configured to produce a light output distribution in accord with the R-lamp industry standard.

FIG. 9 depicts an example of a solid state lamp 160, similar to the lamp of FIG. 7, but which provides a form factor and output distribution of a Par-lamp. Like the lamp of FIG. 8, the lamp 160 includes a container 143 enclosed by a bulb, where the container conforms to and extends through the neck of the bulb. The bulb 163 is similar to the bulb 153 in that it has a reflective coating 163r on inner surfaces of the neck and angled region to provide a directed light output. However, the light output surface of the Par-lamp bulb 163o is relatively flat and typically is transparent. The lamp 160 and the component parts thereof are constructed and operate in much the same was as in the earlier examples. The container 143 has a shape to fit into and extend through the neck of a bulb 153 having a Par-lamp bulb shape. The Par-lamp bulb configuration provides a directed light output distribution substantially defined by the angle(s) of the reflective angled surfaces of the bulb 163, essentially as produced by an industry standard Par-lamp.

In the example of FIG. 9, since the output surface 163o may be clear or transparent, the container 143 may be visible from outside the lamp when the lamp 160 is off. As discussed earlier, however, the dispersion of nanophosphors in liquid or gaseous material in suspension at 15 is clear or transparent to human perception when the lamp is off.

The various lamps shown and discussed in the examples are adaptable to a variety of standard lamp sockets and attendant switch and/or dimming configurations. For these different lamp applications, the lamps incorporate somewhat different forms of the drive circuitry 19. It may be helpful to consider a few different examples of appropriate circuitry.

Figure 10:
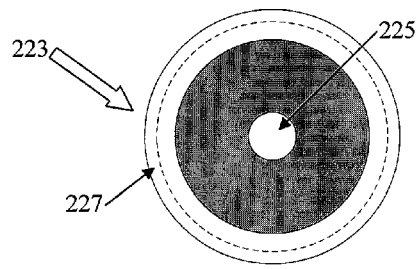
FIG. 10 is a plan view of a screw type lamp base, such as an Edison base or a candelabra base.

For many lamp applications, the existing lamp socket provides two electrical connections for AC mains power. The lamp base in turn is configured to mate with those electrical connections. FIG. 10 is a plan view of a two connection screw type lamp base 223, such as an Edison base or a candelabra base. As shown, the base 223 has a center contact tip 225 for connection to one of the AC main lines. The threaded screw section of the base 223 is formed of metal and provides a second outer AC contact at 227, sometimes referred to as neutral or ground because it is the outer casing element. The tip 225 and screw thread contact 227 are separated by an insulator region (shown in gray).

Figure 11:
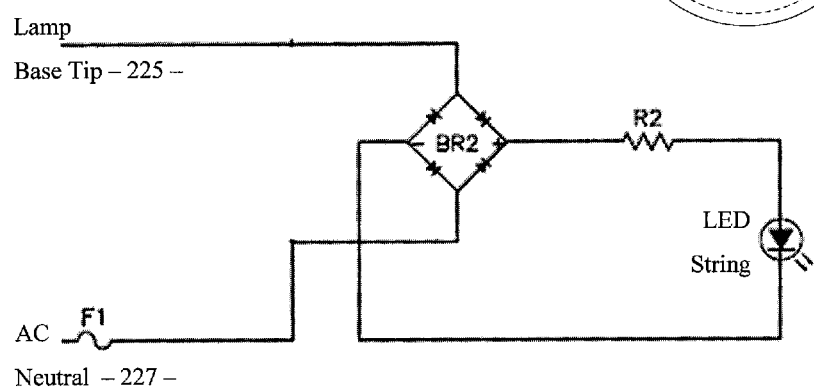
FIG. 11 is an example of the LED and drive circuitry, for driving a string of LEDs from AC line current (rectified in this example, but not converted to DC).

Depending on the type of LEDs selected for use in a particular lamp product design, the LEDs may be driven by AC current, typically rectified; or the LEDs may be driven by a DC current after rectification and regulation. FIG. 11 is an example of the LED and drive circuitry, for driving a string of LEDs from AC line current (rectified in this example, but not converted to DC). Such an implementation may use high voltage LEDs, such as the Seoul A4 LEDs.

In this example, the tip 225 connects one side of the AC line to one node of a four diode bridge rectifier BR2, and the neutral outer AC contact at 227 connects the other side of the AC line to the opposite node of the bridge rectifier BR2. The exemplary circuit also includes a protection fuse F1. The other two nodes of the bridge rectifier BR2 provide rectified AC current to one or more LEDs forming series connected string. A resistor R2 between one bridge node and the LED string limits the current to a level appropriate to the power capacity of the particular LED string.

Figure 12:
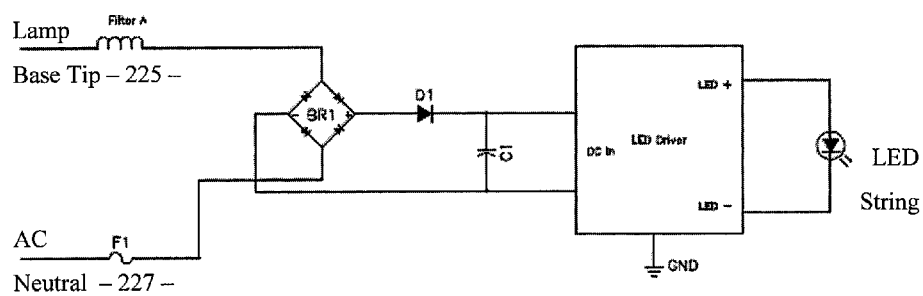
FIG. 12 is an example of the LED and drive circuitry, in which a LED driver converts AC to DC to drive the LEDs.

By way of another example, the LED drive circuitry may be configured for converting AC to DC current and driving the LEDs with the DC current. FIG. 12 is a combination circuit diagram and functional block diagram example of the LED and drive circuitry, in which a LED driver converts AC to DC to drive the LEDs.

The lamp would include a base like 223 shown in FIG. 10. In the circuitry of FIG. 12, the tip 225 connects one side of the AC line through an inductor filter A to one node of a four diode bridge rectifier BR1. The neutral outer AC contact at 227 connects the other side of the AC line through a fuse F1 to the opposite node of the bridge rectifier BR1. The other two nodes of the bridge rectifier BR1 provide rectified AC current to a diode and capacitor circuit (D1, C1) which regulate the current to provide DC. An LED driver adjusts the DC current to the level appropriate to power the string of LEDs. A variety of LED drivers of the type generally represented in block diagram form in FIG. 12 are available on the market and suitable for use in lamps of the type under discussion here.

The lamps discussed here are also adaptable for use in lamp sockets having conventional three-way dimming control settings. For a three-way dimming lamp application, the existing lamp socket provides three electrical connections for AC mains power. One connection is a neutral or common/ground connection. The other two connections are selectively connected to the other line of the AC mains, a first for low, a second for medium and combination of those two for a high setting. The lamp base for a three-way dimmable lamp product is configured to mate with those electrical connections of the switch control and socket.

Figures 13, 14:
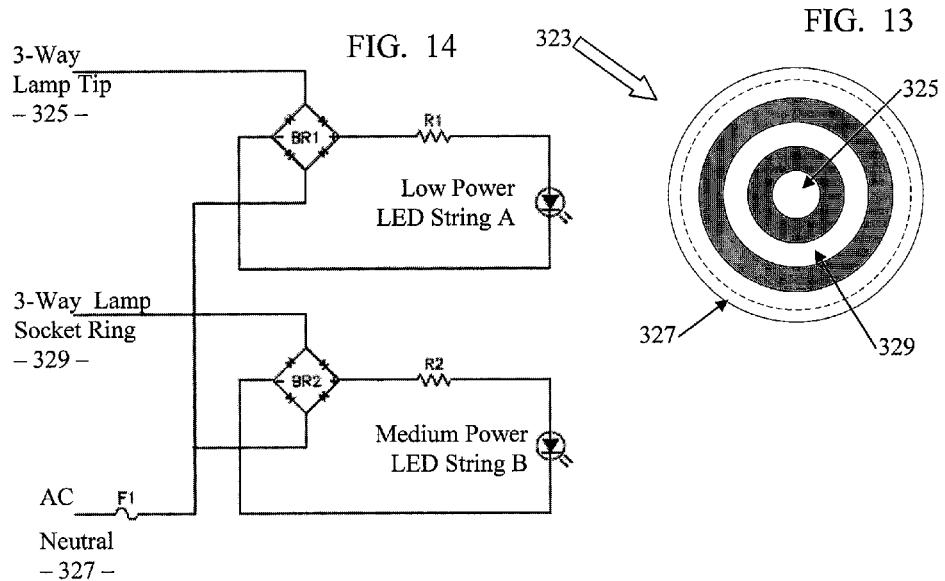
FIG. 13 is a plan view of a three-way dimming screw type lamp base, such as for a three-way mogul lamp base or a three-way medium lamp base.
FIG. 14 shows the LED and circuit arrangement for a three-way dimming lamp, using two different LED strings and associated drive circuitry, for driving two strings of LEDs from AC line current (rectified in this example, but not converted to DC).

FIG. 13 is a plan view of a three-way dimming type lamp base. Although other base configurations are possible, the example is that for a screw-in base 323 as might be used in a three-way mogul lamp or a three-way medium lamp base. As shown, the base 323 has a center contact tip 325 for a low power connection to one of the AC main lines. The three-way base 323 also has a lamp socket ring connector 329 separated from the tip 325 by an insulator region (shown in gray). A threaded screw section of the base 323 is formed of metal and provides a second outer AC contact at 327, sometimes referred to as neutral or ground because it is the outer casing element. The socket ring connector 329 and the screw thread contact 327 are separated by an insulator region (shown in gray).

Figure 15:
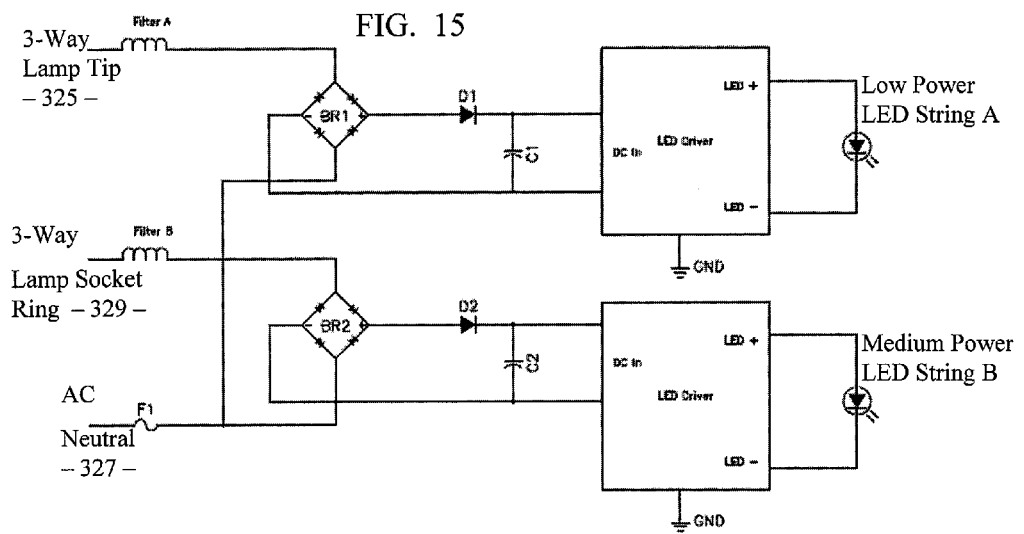
FIG. 15 shows the LED and circuit arrangement for a three-way dimming lamp, using two different LED strings and two associated LED driver circuits for converting AC to DC to drive the respective strings of LEDs.
Figure 16:
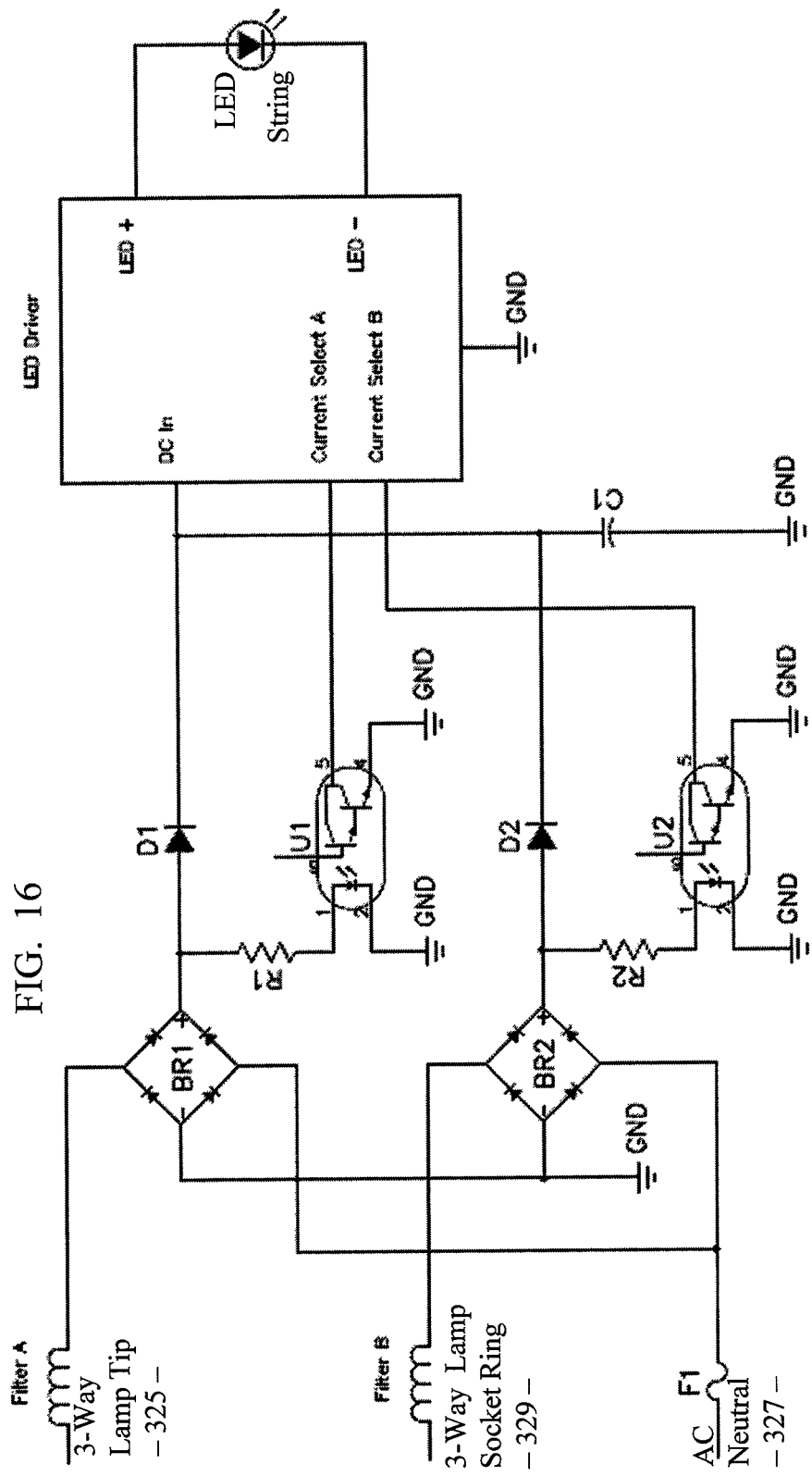
FIG. 16 shows the LED and circuit arrangement for a three-way dimming lamp, but using a single string of LEDs driven in common, where the circuitry converts AC to DC but also is responsive to conventional three-way input switch settings to set corresponding drive levels for driving the LED string.

Various types of circuitry can be used to connect to the AC power through a three-way lamp base like 323 and provide current to drive the LEDs, so that the lamp product provides three corresponding light output levels. Several examples are shown in FIGS. 14-16. In each example, the circuitry is configured and connected to the LEDs to provide three different light levels for the output for the lamp in response to three-way dimming control setting inputs.

FIG. 14 shows the LED and circuit arrangement for a three-way dimming lamp, using two different LED strings and associated drive circuitry, for driving two strings of LEDs from AC line current (rectified in this example, but not converted to DC).

In the example of FIG. 14, the LEDs are configured as two groups, string A and string B. In such an implementation, each string of LEDs may use high voltage LEDs, such as the Seoul A4 LEDs. The first group string A has a first number of one or more LEDs, whereas the other group string B has a second number of LEDs larger than the first number. Is this way, when string A is powered but B is not, the lamp exhibits a first low power light output; however, when string B is powered but A is not, the lamp exhibits a second somewhat higher power light output. Applying power simultaneously to both strings provides a third highest power light output.

As noted, the LEDs of the example of FIG. 14 are driven off the AC without conversion to DC. For LED string A, the tip 325 connects one side of the AC line to one node of a first four diode bridge rectifier BR1, and the neutral outer AC contact at 327 connects the other side of the AC line to the opposite node of the bridge rectifier BR1. For LED string A, the lamp socket ring connector 329 connects one side of the AC line to one node of a four diode bridge rectifier BR2, and the neutral outer AC contact at 327 connects the other side of the AC line to the opposite node of the bridge rectifier BR2. The exemplary circuit also includes a protection fuse F1.

The other two nodes of the first bridge rectifier BR1 provide rectified AC current to one or more LEDs forming the series connected LED string A. A resistor R1 between one bridge node and the LED string A limits the current to a level appropriate to the power capacity of the particular LED string A. Similarly, the other two nodes of the bridge rectifier BR2 provide rectified AC current to one or more LEDs forming the series connected LED string B. A resistor R2 between one bridge node and the LED string limits the current to a level appropriate to the power capacity of the particular LED string B.

Lamp output is proportional to the light generated by the LEDs in the lamp.

In lamp operation, when a user sets the socket switch to a low three-way setting, the socket connects the tip 325 and the neutral contact 327 to the AC lines. This applies rectified power through BR1 and R1 to LED string A. There is no connection through ring 329 to BR2 and thus LED string B remains off. Hence, the circuit responds to a standard low three-way control setting input to turn on the one group of LEDs—string A—while keeping the other group of LEDs—string B—off. String A has the lower number of LEDs and therefore produces the smaller amount of near UV light to pump the nanophosphors, and the lamp provides a low level light output.

When a user sets the socket switch to the medium three-way setting, the socket connects the contact ring 329 and the neutral contact 327 to the AC lines. This applies rectified power through BR2 and R2 to LED string B. There is no connection through the tip 325 to BR1 and thus LED string A remains off. Hence, the circuit responds to a standard medium three-way control setting input to turn on the second group of LEDs—string B—while keeping the first group of LEDs—string A—off. String B has more LEDs than string A and therefore produces more near UV light to pump the nano-phosphors, and the lamp provides a medium level light output.

When a user sets the socket switch to the high three-way setting, the socket connects the tip 325 and the neutral contact 327 to the AC lines and concurrently connects the contact ring 329 and the neutral contact 327 to the AC lines. Power is applied to both LED strings A and B simultaneously. Hence, the circuit driving the LEDs in FIG. 14 responds to a standard high three-way control setting input to concurrently turn on both groups of LEDs. The combined amount of near UV from the two LED strings pumps the nanophosphors with greater energy, and the lamp provides a high intensity light output.

FIG. 15 shows the LED and circuit arrangement for a three-way dimming lamp, using two different LED strings and two associated LED driver circuits for converting AC to DC to drive the respective strings of LEDs. In the example of FIG. 15, like that of FIG. 14, the LEDs are configured as two groups, string A and string B. The first group string A has a first number of one or more LEDs, whereas the other group string B has a second number of LEDs larger than the first number. Is this way, when string A is powered but B is not, the lamp exhibits a first low power light output; however, when string B is powered but A is not, the lamp exhibits a second somewhat higher power light output. Applying power simultaneously to both strings provides a third, highest power light output. Each of strings A and B are powered through individual circuits similar to the circuitry of FIG. 12, although the circuitry supplying power to string A connects to the tip 325 and neutral contact 327, whereas the circuitry for supplying power to string B connects to the contact ring 329 and neutral contact 327. The three-way operation of the circuit of FIG. 15 is similar to that of FIG. 14 except that in the example of FIG. 15 power is converted to an appropriate DC level prior to application thereof to each respective string of LEDs.

Another approach would provide three-way operation, in response to the standard three-way switch settings/inputs, but using a single series connected string of LEDs.

Hence, FIG. 16 shows another LED and circuit arrangement for a three-way dimming lamp, but using a single string of LEDs driven in common, where the circuitry converts AC to DC but also is responsive to conventional three-way input switch settings to set corresponding drive levels for driving the LED string.

The tip 325 connects one side of the AC line through an inductor filter A to one node of a first four diode bridge rectifier BR1, and the neutral outer AC contact at 327 connects the other side of the AC line to the opposite node of the bridge rectifier BR1. The other two nodes of the first bridge rectifier BR1 connect to a diode D1 and ground. The lamp socket ring connector 329 connects one side of the AC line through an inductor filter B to one node of a four diode bridge rectifier BR2, and the neutral outer AC contact at 327 connects the other side of the AC line to the opposite node of the bridge rectifier BR2. The exemplary circuit also includes a protection fuse F1. The other two nodes of the second bridge rectifier BR2 connect to a diode D2 and ground. Both diodes D1, D2 and a capacitor C1 connect to the DC input of a LED driver. In this way, power is supplied to the driver in all three switch states of the lamp socket. In each state, the DC power input to the LED driver is a regulated DC voltage.

The single driver (FIG. 16) uses opto isolators U1 and U2 to distinguish the various positions of the three-way socket switch. BR1, D1, BR2, D2 keep the driver voltage separate to allow sensing of the mechanical three-way socket switch positions.

Opto isolator U1 provides a control signal input whenever power is applied across the tip 325 and the neutral contact 327 to BR1, that is to say in the low and high switch states. Opto isolator U2 provides a control signal input whenever power is applied across the socket ring contact 329 and the neutral contact 327 to BR2, that is to say in the medium and high switch states. In this example, the LED driver implements logic to recognize the three switch states from the control signals from U1 and U2 and variably control the DC current applied to drive the LED string accordingly. The driver adjusts the output current through the single string of LEDs depending on the combination of the current select inputs A and B. In this way, the circuitry of FIG. 16 is configured to detect standard three-way control setting inputs and to adjust the common drive of the single group LEDs to produce corresponding light levels for the output for the lamp. To a user or person in the illuminated area, the lamp using the circuitry of FIG. 16 would appear to operate in exactly the same manner as lamps using circuitry like those of FIGS. 14 and 15.

The circuitry examples are not exhaustive. Other circuit configurations may be used in the lamps discussed herein. Also, other elements may be added, for example, sensors to provide intelligent control. An ambient light sensor, for example, might adjust the lamp output intensity inversely in response to ambient light levels. When on, bright daylight around the lamp would cause the lamp to dim down or turn off to conserve power.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A lamp for producing visible light, comprising:
   a bulb;
   a solid state source comprising a string of a plurality of light emitting diodes (LEDs), configured to cause the lamp to emit a visible light output via the bulb;
   a lighting industry standard lamp base, including connectors arranged in a standard three-way lamp configuration, for providing electricity from a three-way lamp socket;
   a housing supporting the bulb in a position to receive electromagnetic energy from the solid state source, the housing being mechanically connected to the lamp base; and
   circuitry in the housing connected to receive electricity from the connectors of the lamp base as standard three-way control setting inputs, wherein:
   the LEDs are configured to form a single string driven in common by the circuitry; and
   the circuitry is configured to detect the standard three-way control setting inputs and to adjust the common drive to the single string of LEDs to selectively produce a plurality of different visible light outputs of the lamp via the bulb responsive to the three-way control setting inputs.

2. The lamp of claim 1, wherein the bulb provides a form factor and a light distribution in the output of the lamp corresponding to an industry standard light bulb.

3. The lamp of claim 2, wherein the bulb corresponds to an industry standard light bulb selected from the group consisting of: a type-A light bulb; a R-lamp bulb and a Par-lamp bulb.

4. The lamp of claim 1, wherein the circuitry is configured to convert alternating current electricity provided through the lamp base to direct current electricity and is connected to the single string of LEDs to commonly drive the LEDs with the direct current electricity.

5. The lamp of claim 1, further comprising:
   a heat sink; and
   a thermal interface for transfer of heat from the LEDs to the heat sink.

6. The lamp of claim 5, wherein at least the thermal interface is within the housing.

7. The lamp of claim 1, further comprising:
   a plurality of doped semiconductor nanophosphors within the bulb positioned remotely from the LEDs of the solid state source,
   wherein each of the doped semiconductor nanophosphors:
   is a nanophosphor of a type excited in response to electromagnetic energy of one or more wavelengths in a range encompassing at least part of an energy output range of the LEDs of the solid state source,
   is a nanophosphor of a configured to re-emit visible light of a spectrum having substantially no overlap with an absorption spectrum of any other doped semiconductor nanophosphors, and
   includes nanoparticles formed of semiconductor materials which are doped with an impurity.

8. The lamp of claim 7, further comprising:
a container formed by and/or at least partially inside the bulb; and
a light transmissive material at least substantially filling an interior volume of the container,
wherein the of doped semiconductor nanophosphors are dispersed in the material.

9. The lamp of claim 7, wherein:
when excited, the doped semiconductor nanophosphors together produce visible light for inclusion in the output from the lamp when excited by electromagnetic energy received from the solid state source such that:
(a) the visible light output from the lamp produced by excitation of the doped semiconductor nanophosphors is at least substantially white;
(b) the visible light output from the lamp produced by the excitation of the doped semiconductor nanophosphors has a color rendering index (CRI) of 75 or higher; and
(c) the visible light output from the lamp produced by the excitation of the doped semiconductor nanophosphors has a color temperature in one of the following ranges:
2,725±145° Kelvin;
3,045±175° Kelvin;
3,465±245° Kelvin; and
3,985±275° Kelvin.

10. The lamp of claim 1, wherein the circuitry comprises:
logic to recognize the switch states of the three-way control setting inputs; and
a driver responsive to recognition of switch state of the three-way control setting inputs by the logic to control the current applied to drive the LED string to adjust output of the single string of LEDs depending on the recognized switch state.

11. The lamp of claim 10, wherein the logic and/or the driver are configured to adjust the common drive to the single string of LEDs to selectively produce different light output levels for the visible light output of the lamp via the bulb corresponding to the three-way control setting inputs.

12. A lamp, comprising:
light emitting diodes (LEDs), all of the LEDs being connected together with each other to form a single commonly driven solid state light source;
a bulb;
a heat sink;
a thermal interface for transfer of heat from the LEDs to the heat sink;
a lighting industry standard lamp base for providing electricity from a three-way lamp socket,
the lamp base including connectors arranged in a standard three-way lamp configuration, for providing electricity from the three-way lamp socket; and
circuitry, housed as part of the lamp and connected to receive electricity from the lamp base, configured to commonly drive the LEDs of the solid state light source together as a group so as to produce electromagnetic energy from the solid state light source to cause the lamp to emit light via the bulb,
wherein the circuitry is configured to detect the standard three-way control setting inputs and to adjust the common drive to the LEDs to selectively produce a plurality of different light output levels for the light emitted by the lamp via the bulb responsive to the three-way control setting inputs.

13. The lamp of claim 12, wherein the bulb provides a form factor and a light distribution in the output of the lamp corresponding to an industry standard light bulb.

14. The lamp of claim 13, wherein the bulb corresponds to an industry standard light bulb selected from the group consisting of: a type-A light bulb; a R-lamp bulb and a Par-lamp bulb.

15. The lamp of claim 12, wherein the circuitry is configured to convert alternating current electricity provided through the lamp base to direct current electricity and is connected to drive the LEDs with the direct current electricity.

16. The lamp of claim 12, further comprising:
a plurality of doped semiconductor nanophosphors within the bulb positioned remotely from the LEDs of the solid state source,
wherein each of the doped semiconductor nanophosphors:
is a nanophosphor of a type excited in response to electromagnetic energy of one or more wavelengths in a range encompassing at least part of an energy output range of the LEDs,
is a nanophosphor of a configured to re-emit visible light of a spectrum having substantially no overlap with an absorption spectrum of any other doped semiconductor nanophosphors, and
includes nanoparticles formed of semiconductor materials which are doped with an impurity.

17. The lamp of claim 16, further comprising:
a container formed by and/or at least partially inside the bulb; and
a light transmissive material at least substantially filling an interior volume of the container,
wherein the of doped semiconductor nanophosphors are dispersed in the material.

18. The lamp of claim 16, wherein:
when excited, the doped semiconductor nanophosphors together produce visible light for inclusion in the output from the lamp when excited by electromagnetic energy received from the solid state source such that:
(a) the visible light output from the lamp produced by excitation of the doped semiconductor nanophosphors is at least substantially white;
(b) the visible light output from the lamp produced by the excitation of the doped semiconductor nanophosphors has a color rendering index (CRI) of 75 or higher; and
(c) the visible light output from the lamp produced by the excitation of the doped semiconductor nanophosphors has a color temperature in one of the following ranges:
2,725±145° Kelvin;
3,045±175° Kelvin;
3,465±245° Kelvin; and
3,985±275° Kelvin.

19. The lamp of claim 12, wherein the circuitry comprises:
logic to recognize the switch states of the three-way control setting inputs; and
a driver responsive to recognition of switch state of the three-way control setting inputs by the logic to control the current applied to commonly drive the LEDs to adjust output level of the LEDs depending on the recognized switch state.

20. The lamp of claim 19, wherein the logic and/or the driver are configured to adjust the common drive to the single string of LEDs to selectively produce three different light output levels for the visible light output of the lamp via the bulb corresponding to the three-way control setting inputs.

* * * * *